US012785126B2

(12) United States Patent
Huo et al.

(10) Patent No.: US 12,785,126 B2
(45) Date of Patent: Nov. 3, 2026

(54) CATHODE CATALYSTS FOR CARBON OXIDE ELECTROLYZERS

(71) Applicant: Twelve Benefit Corporation, Berkeley, CA (US)

(72) Inventors: Ziyang Huo, Moraga, CA (US); Chengtian Shen, Irvine, CA (US); Kenneth X. Hua, San Jose, CA (US); Angelica L. Reyes, Berkeley, CA (US); Rebecca Nicholson, Oakland, CA (US); Zixu Tao, Richmond, CA (US); Yueshen Wu, Irvine, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 558 days.

(21) Appl. No.: 18/053,945

(22) Filed: Nov. 9, 2022

(65) Prior Publication Data

US 2023/0155153 A1 May 18, 2023

Related U.S. Application Data

(60) Provisional application No. 63/263,810, filed on Nov. 9, 2021.

(51) Int. Cl.
*H01M 8/00* (2016.01)
*H01M 4/86* (2006.01)
(Continued)

(52) U.S. Cl.
CPC ....... *H01M 8/1004* (2013.01); *H01M 4/8673* (2013.01); *H01M 4/9041* (2013.01);
(Continued)

(58) Field of Classification Search
CPC ........ H01M 8/1004; H01M 4/86; H01M 4/90; H01M 4/92; Y02E 60/10
See application file for complete search history.

(56) References Cited

U.S. PATENT DOCUMENTS

| | | | |
|---|---|---|---|
| 3,766,027 | A | 10/1973 | Gregory |
| 4,959,131 | A | 9/1990 | Cook et al. |

(Continued)

FOREIGN PATENT DOCUMENTS

| | | | |
|---|---|---|---|
| CA | 3070723 | A1 | 1/2019 |
| CN | 105612644 | A | 5/2016 |

(Continued)

OTHER PUBLICATIONS

Dobrovolskii et al., Method for Producing Metal-Oxide Catalytic Electrode for Low-Temperature Fuel Elements, May 2014; See the Abstract. (Year: 2014).*

(Continued)

*Primary Examiner* — Tiffany Legette
*Assistant Examiner* — Monique M Wills
(74) *Attorney, Agent, or Firm* — Weaver Austin Villeneuve & Sampson LLP

(57) ABSTRACT

Aspects of this disclosure pertain to catalyst compositions that include electrically conductive support particles; and metal catalyst particles attached to the electrically conductive support particles. The catalyst compositions may be used in cathodes of carbon oxide reduction electrolyzers.

21 Claims, 11 Drawing Sheets
(2 of 11 Drawing Sheet(s) Filed in Color)

(51) Int. Cl.
*H01M 4/90* (2006.01)
*H01M 4/92* (2006.01)
*H01M 8/1004* (2016.01)

(52) U.S. Cl.
CPC ......... *H01M 4/9083* (2013.01); *H01M 4/926* (2013.01); *H01M 2250/20* (2013.01)

(56) References Cited

U.S. PATENT DOCUMENTS

| | | | |
|---|---|---|---|
| 5,992,008 A | 11/1999 | Kindler | |
| 7,883,817 B2 | 2/2011 | Hori et al. | |
| 8,697,129 B2 | 4/2014 | Qian et al. | |
| 9,012,345 B2 | 4/2015 | Masel et al. | |
| 9,486,480 B2 | 11/2016 | Ayoub et al. | |
| 9,587,071 B2 | 3/2017 | Sun et al. | |
| 9,692,060 B2 * | 6/2017 | Chokai | H01M 4/90 |
| 9,929,412 B2 * | 3/2018 | Ueyama | B82Y 30/00 |
| 10,092,661 B2 | 10/2018 | Qian et al. | |
| 10,822,709 B2 | 11/2020 | Kuhl et al. | |
| 11,011,756 B2 | 5/2021 | Pintauro et al. | |
| 11,221,330 B2 | 1/2022 | Alocilja et al. | |
| 11,268,200 B2 | 3/2022 | Oener et al. | |
| 11,271,220 B2 | 3/2022 | Morin et al. | |
| 11,643,736 B2 | 5/2023 | Yamaguchi et al. | |
| 12,116,683 B2 | 10/2024 | Hunegnaw et al. | |
| 12,305,304 B2 | 5/2025 | Zhao et al. | |
| 12,378,685 B2 | 8/2025 | Wu et al. | |
| 2008/0045401 A1 | 2/2008 | Zhou et al. | |
| 2010/0068592 A1 | 3/2010 | Akiyama et al. | |
| 2010/0087309 A1 * | 4/2010 | Kwon | B01J 35/45 422/128 |
| 2010/0142123 A1 | 6/2010 | Smith et al. | |
| 2010/0193370 A1 | 8/2010 | Olah et al. | |
| 2013/0105304 A1 | 5/2013 | Kaczur et al. | |
| 2014/0093799 A1 | 4/2014 | Masel et al. | |
| 2015/0068915 A1 | 3/2015 | Hoch et al. | |
| 2015/0267309 A1 | 9/2015 | Kaczur et al. | |
| 2016/0151739 A1 | 6/2016 | Jakobsson et al. | |
| 2016/0194766 A1 | 7/2016 | Eastman et al. | |
| 2016/0251766 A1 | 9/2016 | Masel et al. | |
| 2016/0369415 A1 | 12/2016 | Masel et al. | |
| 2017/0104223 A1 | 4/2017 | Kaneko et al. | |
| 2017/0204525 A1 | 7/2017 | Mutoro et al. | |
| 2017/0321333 A1 | 11/2017 | Kuhl et al. | |
| 2017/0321334 A1 | 11/2017 | Kuhl et al. | |
| 2018/0151890 A1 | 5/2018 | Ishida et al. | |
| 2018/0265440 A1 | 9/2018 | Kudo et al. | |
| 2018/0274114 A1 | 9/2018 | Ono et al. | |
| 2019/0085477 A1 | 3/2019 | Ono et al. | |
| 2019/0127865 A1 | 5/2019 | Li et al. | |
| 2019/0211463 A1 | 7/2019 | Masel | |
| 2020/0216968 A1 | 7/2020 | Hunegnaw et al. | |
| 2020/0220185 A1 | 7/2020 | Ma et al. | |
| 2020/0240023 A1 | 7/2020 | Cave et al. | |
| 2020/0308718 A1 | 10/2020 | Patru et al. | |
| 2020/0370188 A1 | 11/2020 | Oener et al. | |
| 2021/0079537 A1 | 3/2021 | Spurgeon | |
| 2021/0180196 A1 | 6/2021 | Schmid et al. | |
| 2021/0207275 A1 | 7/2021 | Huo et al. | |
| 2021/0292924 A1 | 9/2021 | Sargent et al. | |
| 2021/0381116 A1 | 12/2021 | Kashi et al. | |
| 2021/0395908 A1 | 12/2021 | Kuhl et al. | |
| 2022/0025527 A1 | 1/2022 | Yamaguchi et al. | |
| 2022/0136119 A1 | 5/2022 | Flanders et al. | |
| 2022/0267916 A1 | 8/2022 | Zhao et al. | |
| 2023/0175146 A1 | 6/2023 | Kashi et al. | |
| 2023/0264148 A1 | 8/2023 | Boettcher et al. | |
| 2024/0141514 A1 | 5/2024 | Zhao et al. | |
| 2024/0254641 A1 | 8/2024 | Wu et al. | |

FOREIGN PATENT DOCUMENTS

| | | | | |
|---|---|---|---|---|
| CN | 108570690 A | | 9/2018 | |
| CN | 108624896 A | | 10/2018 | |
| CN | 113227457 A | | 8/2021 | |
| CN | 113614287 A | | 11/2021 | |
| DE | 102014224013 A1 | | 5/2016 | |
| DE | 102017208610 A1 | | 11/2018 | |
| DE | 102018210303 A1 | | 1/2020 | |
| EP | 3375907 A1 | | 9/2018 | |
| EP | 3378969 A1 | | 9/2018 | |
| EP | 3434810 A1 | | 1/2019 | |
| JP | 2007206055 A | * | 8/2007 | G01N 27/4071 |
| JP | 2012112001 A | | 6/2012 | |
| JP | 2016102245 A | | 6/2016 | |
| JP | 2017073356 A | * | 4/2017 | |
| JP | 2018031034 A | | 3/2018 | |
| JP | 2018150592 A | | 9/2018 | |
| JP | 2018150595 A | | 9/2018 | |
| KR | 20150073651 A | | 7/2015 | |
| KR | 20190094650 A | | 8/2019 | |
| KR | 20190133914 A | * | 12/2019 | |
| RU | 2012148408 A | * | 5/2014 | |
| WO | WO-2013089112 A1 | | 6/2013 | |
| WO | WO-2015053362 A1 | | 4/2015 | |
| WO | WO-2016108603 A1 | | 7/2016 | |
| WO | WO-2017192787 A1 | | 11/2017 | |
| WO | WO-2017192788 A1 | | 11/2017 | |
| WO | WO-2019020239 A1 | | 1/2019 | |
| WO | WO-2019120812 A1 | | 6/2019 | |
| WO | WO-2019136018 A2 | | 7/2019 | |
| WO | WO-2019206882 A1 | | 10/2019 | |
| WO | WO-2020112919 A1 | | 6/2020 | |
| WO | WO-2020132064 A1 | | 6/2020 | |
| WO | WO-2021252535 A2 | | 12/2021 | |

OTHER PUBLICATIONS

Kanekoet al., Catalyst layer for fuel cell and fuel cell, Apr. 2017. See the Abstract. (Year: 2017).*

Baek et al., Method for preparing Pd/C catalyst using Pd recovered from spent catalyst, Dec. 2019, See the Abstract. (Year: 2019).*

Tanaka et al., Gas Sensor Element, Aug. 2007, See the Abstract. (Year: 2007).*

Endrodi, B. et al., "Continuous-flow electroreduction of carbon dioxide," Progress in Energy and c, vol. 62, Jun. 13, 2017, pp. 133-154.

International Search Report and Written Opinion dated Jan. 10, 2022, in Application No. PCT/US2021/036475.

International Search Report and Written Opinion issued on Apr. 2, 2020, in PCT Application No. PCT/US2020/012600.

Nafion XL, Ion Exchange Materials, "Perfluorosulfonic Acid (PFSA) Membranes for Fuel," Cells Fuel Cell Store, Product Bulletin P-22, 4 pages.

Office Action issued on Jan. 26, 2021, in U.S. Appl. No. 16/736,615.

U.S. Office Action dated May 6, 2022, in U.S. Appl. No. 16/736,615.

U.S. Office Action dated Oct. 25, 2021, in U.S. Appl. No. 16/736,615.

Delacourt et al., "Design of an Electrochemical Cell Making Syngas (CO+H2) from CO2 and H2O Reduction at Room Temperature," Journal of The Electrochemical Society, 155 (1), (2008), pp. B42-B49.

Gangeri, M et al., "Fe and Pt Carbon Nanotubes for the Electrocatalytic Conversion of Carbon Dioxide to Oxygenates", Catalysis Today, May 2009, vol. 143, pp. 57-63.

Hori, Y et al., "Silver-coated Ion Exchange Membrane Electrode Applied to Electrochemical Reduction of Carbon Dioxide", Electrochimica Acta, Aug. 2003, vol. 48, pp. 2651-2657.

AE Search Report and Examination Report dated Jun. 26, 2024 in AE Application No. P6001154/2021.

Ahlfield J., et al., "PEM/AEM Junction Design for Bipolar Membrane Fuel Cells," Journal of The Electrochemical Society, 2017, vol. 164 (12), pp. F1165-F1171.

AU Examination Report dated Nov. 18, 2024, in AU Application No. 20200206328.

Bakshi M., et al., "How Surfactants Control Crystal Growth of Nanomaterials," ACS Crystal Growth & Design, 2016, vol. 16, pp. 1104-1133.

(56) References Cited

OTHER PUBLICATIONS

Balster, J. et al., "Tailoring the Interface Layer of the Bipolar Membrane", Journal of Membrane Science, vol. 365, No. 1-2, Dec. 2010, pp. 389-398.
Baturina O.A., et al., "Co2 Electroreduction to Hydrocarbons on Carbon-supported Cu Nanoparticles", ACS Catalysis, 2014, vol. 4, pp. 3682-3695.
BR Office Action dated Oct. 30, 2023, in BR Application No. 112021013400-0 with English Translation.
CA Office Action dated Jan. 15, 2024 in CA Application No. 3125442.
Chen L., et al., "Design Principles for Water Dissociation Catalysts in High-performance Bipolar Membranes," Nature Communications, 2022, vol. 13 Article No. 3846, pp. 1-10.
CN Office Action dated May 15, 2024 in CN Application No. 202080013419.4 with English translation.
EP office action dated Sep. 1, 2023, in application No. EP20703613.8.
Gabardo C M et al., "Continuous Carbon Dioxide Electroreduction to Concentrated Multi-carbon Products Using a Membrane Electrode Assembly," Joule, Nov. 20, 2019, vol. 3, pp. 1-15.
Gao, M., et al., "The Role of Adsorbed Oleylamine on Gold Catalysts During Synthesis for Highly Selective Electrocatalytic Reduction of CO2 to CO," The Royal Society of Chemistry, 2020, vol. 56, pp. 7021-7024.
Hernandez S., et al., Snygas Production from Electrochemical Reduction of CO2: Current Status and Prospective Implementation, Green Chemistry, May 2017, vol. 19 (10), pp. 2326-2346.
Hori, Y., et al., "Electroreduction of CO to CH4 and C2H4 at a Copper Electrode in Aqueous Solutions at Ambient Temperature and Pressure", Journal of the American Chemical Society, Aug. 5, 1987, vol. 109, pp. 5022-5023.
Indian Office Action dated Feb. 6, 2023, in IN Application No. IN202117034224.
International Preliminary Report on Patentability dated Dec. 22, 2022, in PCT Application No. PCT/US2021/036475.
International Preliminary Report on Patentability and Written Opinion dated Apr. 24, 2025 in PCT Application No. PCT/US2023/075864.
International Preliminary Report on Patentability and Written Opinion dated Jul. 3, 2025 in PCT Application No. PCT/US2023/085244.
International Preliminary Report on Patentability and Written Opinion dated Jun. 20, 2024 in PCT Application No. PCT/US2022/081209.
International Preliminary Report on Patentability and Written Opinion dated May 23, 2024 in PCT Application No. PCT/US2022/079570.
International Preliminary Report on Patentability issued on Jul. 22, 2021, in PCT Application No. PCT/US2020/012600.
International Preliminary Report on Patentability issued on Jun. 10, 2021, in PCT Application No. PCT/US2019/063471.
International Search Report and Written Opinion dated Apr. 26, 2024 in PCT Application No. PCT/US2023/075864.
International Search Report and Written Opinion dated Jul. 19, 2024 in PCT Application No. PCT/US2023/085244.
International Search Report and Written Opinion dated Mar. 10, 2023 in PCT Application No. PCT/US2022/079570.
International Search Report and Written Opinion dated May 6, 2024 in PCT Application No. PCT/US2022/081209.
Invitation to Pay Additional Fees dated May 28, 2024 in PCT Application No. PCT/US2023/085244.
JP Office Action dated Aug. 6, 2024 in JP Application No. 2021-538665, with English Translation.
JP Office Action dated Jan. 9, 2024 in JP Application No. 20210538665 with English translation.
JP Office Action dated Jul. 1, 2025 in JP Application No. 2022-575454, with English Translation.
KR Office Action dated Dec. 10, 2024 in KR Application No. 10-2021-7024967, with English Translation.
Liu C., et al., "Constructing a Multifunctional Interface Between Membrane and Porous Transport Layer for Water Electrolyzers," ACS Applied Materials & Interfaces, 2021, vol. 13, pp. 16182-16196.
Ma, M., et al., "Insights into the Carbon Balance for C02 Electroreduction on Cu using Gas Diffusion Electrode Reactor Designs", Energy & Environmental Science, Feb. 12, 2020, vol. 13, pp. 977-985.
Machine translation of Kang et al KR20150073651A, 2015.
Machine translation of Shin et al WO2016108603A1, 2016.
Mandal M., et al., "Improved Polymer Electrolyte Membrane Water Electrolyzer Performance by Using Carbon Black as a Pore Former in the Anode Catalyst Layer," Journal of Power Sources, 2022, vol. 541, pp. 1-13.
Mayerhofer B., et al., "Bipolar Membrane Electrode Assemblies for Water Electrolysis," ACS Applied Energy Materials, 2020, vol. 3, pp. 9635-9644.
Mcdonald M., et al., "Graphene Oxide as a Water Dissociation Catalyst in the Bipolar Membrane Interfacial Layer," ACS Applied Materials & Interfaces, 2014, vol. 6, pp. 13790-13797.
Merino-Garcia, I., et al., "Productivity and Selectivity of Gas-Phase CO2 Electroreduction to Methane at Copper Nanoparticle-Based Electrodes," Energy Technology, 2017, vol. 5, pp. 922-928.
Morsy S., et al., "Role of Surfactants in Nanotechnology and Their Applications," International Journal of current Microbiology and Applied Sciences, 2014, vol. 3(5), pp. 237-260.
Nakashima T., et al., "Preparation of Fusion Materials Based on Ionic Liquids and Cationic Gold Nanoparticles", Polymer Journal, 2015, vol. 47, pp. 171-176.
Pappijn, C., et al., "Challenges and Opportunities of Carbon Capture and Utilization: Electrochemical Conversion of CO2 to Ethylene," Original research, 2020, vol. 8, pp. 1-12.
Patru, A., et al., "Design Principles of Bipolar Electrochemical Co-Electrolysis Cells for Efficient Reduction of Carbon Dioxide from Gas Phase at Low Temperature," Journal of The Electrochemical Society, 166 (2), (2019), pp. F34-F43.
Phan C., et al., "Role of Capping Agent in Wet Synthesis of Nanoparticles," The Journal of Physical Chemistry A, 2017, vol. 121, pp. 3213-3219.
Rasouli, Armin., et al., "CO2 Electroreduction to Methane at Production Rates Exceeding 100 mA/cm2", ACS Sustainable Chemistry & Engineering, 2020, vol. 8(39), pp. 1-6.
Ren D., et al., "The Effects of Currents and Potentials on the Selectivities of Copper Toward Carbon Dioxide Electroreduction," Nature Communication, 2018, 9:925, pp. 1-8.
Rong, Weifeng., et al., "Size-dependent Activity and Selectivity of Atomic-level Copper Nanoclusters During CO/CO2 Electroreduction", Angewandte Chemie, 2021, vol. 60, pp. 466-472.
Rucareanu S., et al., 4-(N,N-Dimethylamino)pyridine-Protected Au Nanoparticles: Versatile Precursors for Water and Organic-Soluble Gold Nanoparticles, Chem. Mater, 2006, vol. 18, pp. 4674-4680.
SA Office Action dated Mar. 12, 2024 in SA Application No. 521422472 with English translation.
SA Office Action dated Sep. 26, 2023, in application No. SA522441684 with English Translation.
SA Office Action dated Sep. 27, 2023, in application No. SA521422472 with English translation.
Seo M.H., et al., "Synthesis, Characterization, and Electrocatalytic Properties of a Polypyrrole-composited Pd/C Catalyst," International Journal of Hydrogen Energy, 2011, vol. 36(18), pp. 11545-11553.
Sturman, M., et al., "Process Parameters in the Electrochemical Reduction of Carbon Dioxide to Ethylene," ChemBioEng, 2021, vol. 8(3), pp. 1-41.
U.S. Final Office Action dated Aug. 30, 2023, in U.S. Appl. No. 17/342,406.
U.S. Final Office Action dated Feb. 8, 2024 in U.S. Appl. No. 18/327,835.
U.S. Final office Action dated Jan. 31, 2023 in U.S. Appl. No. 16/736,615.
U.S. Final Office Action dated Jul. 2, 2024 in U.S. Appl. No. 18/327,835.

(56) References Cited

OTHER PUBLICATIONS

U.S. Final Office Action dated Mar. 12, 2024 in U.S. Appl. No. 18/328,524.
U.S. Non-Final Office Action dated Aug. 15, 2023, in U.S. Appl. No. 18/328,524.
U.S. Non-Final Office Action dated Dec. 11, 2024 in U.S. Appl. No. 17/342,406.
U.S. Non-Final Office Action dated Jul. 25, 2024 in U.S. Appl. No. 18/328,524.
US Non-Final Office Action dated Jun. 10, 2025 in U.S. Appl. No. 17/342,406.
U.S. Non-Final Office Action dated Jun. 17, 2024 in U.S. Appl. No. 17/342,406.
US Non-Final Office Action dated Jun. 18, 2025 in U.S. Appl. No. 18/063,508.
U.S. Non-Final Office Action dated Mar. 14, 2023 in U.S. Appl. No. 17/342,406.
U.S. Non-Final Office Action dated Oct. 20, 2023, in U.S. Appl. No. 16/736,615.
U.S. Non-Final Office Action dated Sep. 22, 2023, in U.S. Appl. No. 18/327,835.
U.S. Notice of Allowance dated Apr. 14, 2025 in U.S. Appl. No. 18/328,524.
U.S. Notice of Allowance dated Jan. 23, 2025 in U.S. Appl. No. 18/327,835.
U.S. Notice of Allowance dated Jul. 8, 2024 in U.S. Appl. No. 16/736,615.
Xie K., et al., "Bipolar Membrane Electrolyzers Enable High Single Pass $CO_2$ Electroreduction to Multicarbon Products," Nature Communications 2022, vol. 13 (1), pp. 1-13.
U.S. Notice of Allowance dated Nov. 18, 2025 in U.S. Appl. No. 18/063,508.
EP Extended European Search report dated Oct. 31, 2025 in EP Application No. 22893815.5.

* cited by examiner

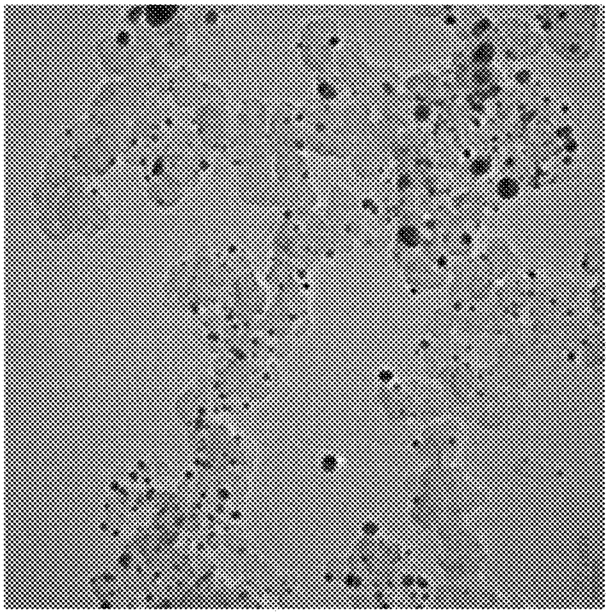
Figure 6
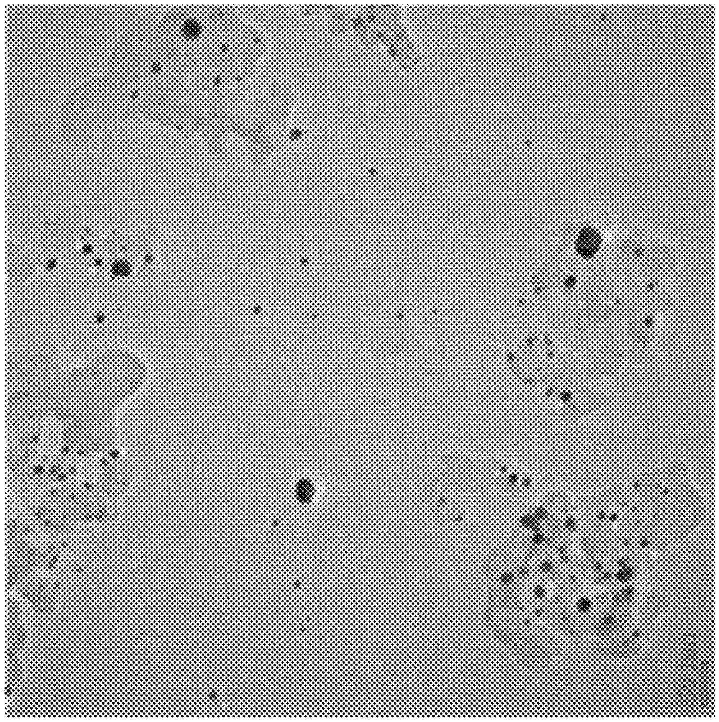

CATHODE CATALYSTS FOR CARBON OXIDE ELECTROLYZERS

STATEMENT OF GOVERNMENT SUPPORT

This invention was made with government support under United States Department of Energy Award Number DE-AC36-08GO28308. The government has certain rights in the invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

BACKGROUND

Electrolytic carbon oxide reduction reactors must employ catalysts to facilitate reduction of the carbon oxide reactant. The properties of a catalyst can have a strong impact on the electrolytic reactor's operating voltage, Faradaic yield, and mix of products generated at the cathode, including carbon monoxide (CO) and/or other carbon-containing products (CCPs) and hydrogen.

Background and contextual descriptions contained herein are provided solely for the purpose of generally presenting the context of the disclosure. Much of this disclosure presents work of the inventors, and simply because such work is described in the background section or presented as context elsewhere herein does not mean that such work is admitted prior art.

SUMMARY

This summary is provided to introduce a selection of concepts in simplified form that are further described below in the Detailed Description. This summary is not intended to identify key features or essential features of the claimed subject matter, nor is it intended to be used as an aid in determining the scope of the claimed subject matter.

Aspects of this disclosure pertain to a catalyst composition that includes: (a) electrically conductive support particles; and (b) metal catalyst particles attached to the electrically conductive support particles. The metal catalyst particles may have a mean diameter of about 2 to 100 nm, or about 2 to 50 nm, or about 2 to 10 nm. In certain embodiments, the metal catalyst particles have a particle size dispersity of at most about 200%, or at most about 15%. In certain embodiments, the metal catalyst particles have a loading in catalyst composition of about 20-40% by mass fraction.

In certain embodiments, at least some of the metal catalyst particles attached to the conductive support particles have nearest neighbor metal catalyst particles on their respective conductive support particles to which they are attached, and such metal catalyst particles may be characterized by a spacing between the nearest neighbor metal catalyst particles, and that spacing may be characterized by a dispersity of about 50% or less.

In certain embodiments, at least about 80% of electrically conductive particles are attached to the metal catalyst particles. In certain embodiments, at least about 95% of the metal catalyst particles are attached to the electrically conductive support particles.

In certain embodiments, at least about 90% of the metal catalyst particles are single crystal particles. In certain embodiments, at least about 85% of metal catalyst particles in the composition have a sphericity of at least about 90%.

In certain embodiments, the electrically conductive support particles have a mean diameter of about 10 to 100 nm, about 20-100 nm, or about 20 to 50 nm. In certain embodiments, the electrically conductive support particles have a porosity of about 25% to 75%. In certain embodiments, the electrically conductive support particles have a surface area to volume of about 25 to 225 $cm^3/100$ g.

In certain embodiments, the metal catalyst particles comprise at least about 90% atomic of a metal selected from the group consisting of gold, platinum, rhenium, ruthenium, rhodium, palladium, silver, osmium, and iridium. In certain embodiments, the metal catalyst particles comprise gold metal.

In certain embodiments, the metal catalyst particles comprise about 200 ppm or less of boron or one or more alkali metals. In certain embodiments, the metal catalyst particles comprise about 20 ppm or less of any transition metal.

In certain embodiments, the electrically conductive support particles comprise carbon. In certain embodiments, the electrically conductive support particles comprise an amorphous carbon. In certain embodiments, the electrically conductive support particles comprise carbon black.

Some aspects of this disclosure pertain to cathode catalyst layers comprising: (a) an ionomer; and (b) a catalyst composition such as that having any one or more of the properties identified above. In some embodiments, the ionomer is an anion conducting polymer.

Some aspects of this disclosure pertain to membrane electrode assemblies comprising a catalyst layer such as described above.

In the above-described aspects of the disclosure, any combination of the one or more dependent features may be implemented together with, or apart from, one another when used with the primary catalyst composition and membrane electrode assembly aspects. These and other features of the disclosure will be presented below, and some aspects will be discussed with reference to the Figures.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

FIG. 6 also shows images of commercially sourced gold decorated carbon particles (left panel) and gold decorated carbon particles in accordance with aspects of this disclosure (right panel).

DETAILED DESCRIPTION

Introduction and Context

Figure 1:
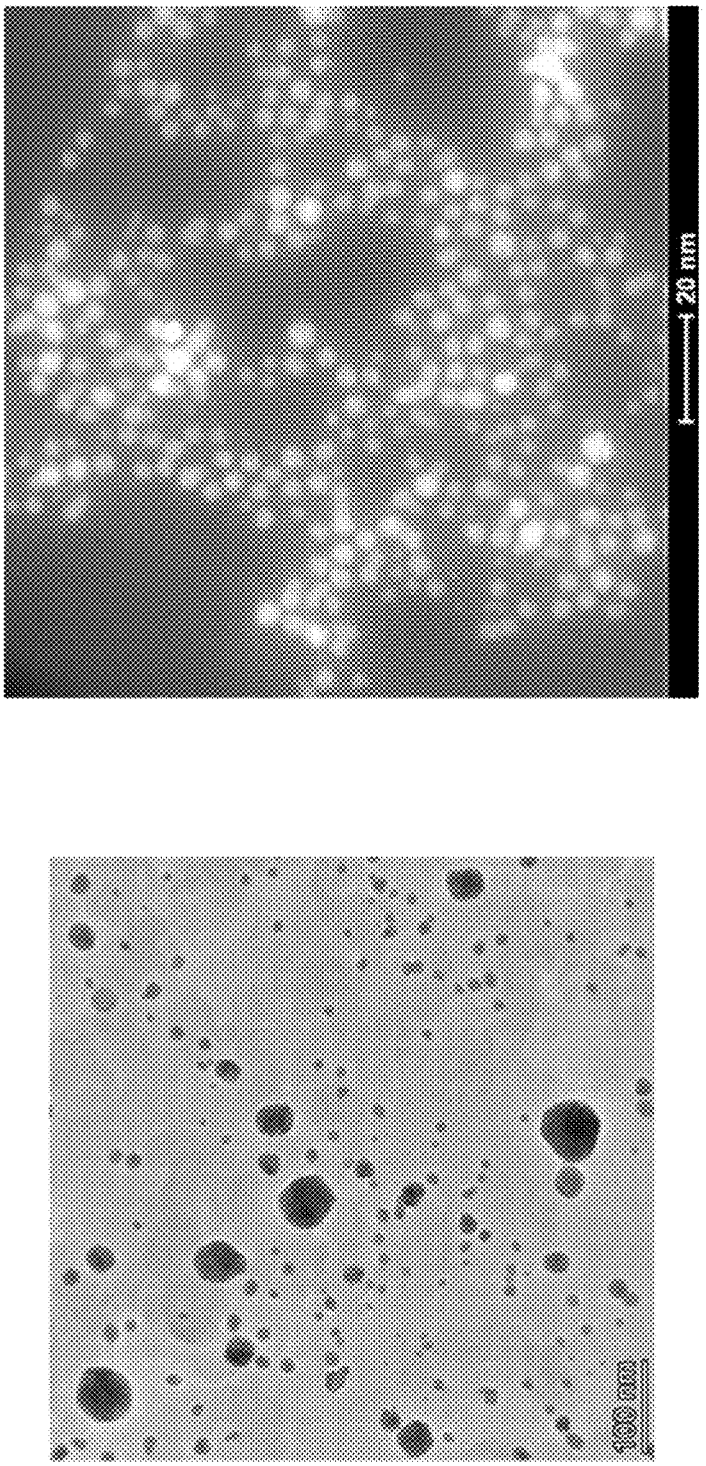
FIG. 1 shows a comparison of size and uniformity of commercially sourced gold nanoparticles (left panel) with gold particles in accordance with aspects of this disclosure (right panel).

Carbon oxide electrolyzers containing polymer-based membrane electrode assemblies (MEAs) are designed or configured to produce oxygen from water at an anode and produce one or more carbon-based compounds through the electrochemical reduction of carbon dioxide or other carbon oxide at a cathode. Various examples of MEAs and MEA-based carbon oxide electrolyzers are described in the following references: Published PCT Application No. 2017/192788, published Nov. 9, 2017, and titled "REACTOR WITH ADVANCED ARCHITECTURE FOR THE ELECTROCHEMICAL REACTION OF CO2, CO, AND OTHER CHEMICAL COMPOUNDS," Published PCT Application No. 2019/144135, published Jul. 25, 2019, and titled "SYSTEM AND METHOD FOR CARBON DIOXIDE REACTOR CONTROL," and Published PCT Application No. 2021/108446, published Jun. 3, 2021, and titled "MEMBRANE ELECTRODE ASSEMBLY FOR COX REDUCTION," each of which is incorporated herein by reference in its entirety.

In some cases, an MEA has a bipolar interface, i.e., an interface between a layer of a first ion exchange polymer that is substantially more conductive to anions than cations and a layer of a second ion exchange polymer that is substantially more conductive to cations than anions. In some cases, an MEA contains only an anion exchange polymer or multiple anion exchange polymers, optionally provided as a plurality of layers.

An MEA's cathode, which is also referred to as the cathode layer or cathode catalyst layer, facilitates $CO_x$ reduction. It contains catalysts for $CO_x$ reduction reactions. In some embodiments, it also contains electronically conductive support particles that provide support for the reduction catalyst particles and/or an ion-conducting polymer. In some embodiments, the reduction catalyst particles are combined with the ion-conducting polymer but without a support. In some cases, a cathode layer is porous. Example thicknesses of the cathode layer range from about 80 nm-300 μm.

In some examples, catalysts are metal particles such as gold, silver, or copper particles. In some embodiments, metal catalyst particles have an average size from approximately 0.1 to 1000 nm, or from approximately 1 to 100 nm, or from approximately 0.2 to 10 nm. In some embodiments, catalysts can be in the form of films and nanostructured surfaces.

If used, an electronically-conductive support in the cathode may be made of various materials and have various forms. For example, a support may include carbon particles such as carbon black particles. Other example conductive support particles include boron-doped diamond or fluorine-doped tin oxide.

A single cathode may include one, two, or more types of catalyst. For example, a cathode may include one catalyst that is good at one reaction (e.g., $CO_2 \rightarrow CO$) and the second catalyst that is good at another reaction (e.g., $CO \rightarrow CH_4$). In such example, a cathode layer may perform the transformation of $CO_2$ to $CH_4$, but with different steps in the reaction occurring preferentially on different catalysts.

In addition to metal catalyst particles, a cathode ion conducting polymer, and an electronically-conductive support, the cathode catalyst layer may include other additives such as additives that promote pore formation. As an example, such additive may be PTFE particles or fibers. In some embodiments, void space forms around such particles.

Terminology

Unless defined otherwise, all technical and scientific terms used herein have the same meaning as commonly understood by one of ordinary skill in the art. The terms presented immediately below may be more fully understood by reference to the remainder of the specification. The following descriptions are presented to provide context and an introduction to the complex concepts described herein. These descriptions are not intended to limit the full scope of the disclosure.

Carbon oxide—As used herein, the term carbon oxide includes carbon dioxide ($CO_2$), carbon monoxide (CO), carbonate ions ($CO_3^{2-}$), bicarbonate ions ($HCO_3^-$), and any combinations thereof.

Catalyst particle-A catalyst particle is a particle that lowers the activation energy of a given reaction, which is typically a desired reaction such as reduction of a carbon oxide at the cathode of an electrolyzer. A catalyst particle includes a material that catalyzes the reaction. Such material may be a metal such as gold, silver, copper, or any other metal that can catalyze a desired reaction. The particle may have any of a variety of characteristics such as composition, physical dimensions, shape, crystallinity, etc. The particle may have a composition that is homogeneous (e.g., substantially pure catalyst material) or heterogenous.

Support particle—In some embodiments, a catalyst particle is provided on a support particle. A support particle may hold or be attached to one, two, or more catalyst particles. When used in a catalyst layer for an electrolyzer, a support particle may serve to present the catalyst particles in a way that makes them accessible to a reactant such as a carbon oxide. A support particle may impart one or more other features to a catalyst layer. For example, a support particle may impart electrical and/or thermal conductivity to the catalyst layer. Electrical conductivity may be for electrons and or ions.

Decorated support particle—A decorated support particle is a support particle having one or more catalyst particles attached thereto. In some cases, the support particles are, on average, larger than the catalyst particles. As a consequence, support particles may have, on average, many (e.g., five or more) catalyst particles attached thereto.

A mixture contains two or more components and unless otherwise stated may contain components other than the identified components.

Cathode Catalyst Particle Parameters

Metal particles in a catalyst may be characterized by various parameters. The following description identifies some of these parameters. Examples of metal catalyst parameters that may affect the cathode performance include size, size distribution, uniformity of coverage on the support particles, shape, loading (characterized as weight of metal/weight of metal+weight of carbon or as mass of particles per geometric area of catalyst layer), surface area (actual metal catalyst surface area per volume of catalyst layer), purity, etc.

In some cases, the metal particles are gold nanoparticles. In other cases, the particles comprise a different metal such as a different noble metal (e.g., platinum) or a transition metal (e.g., copper). In some cases, metal catalyst nanoparticles comprise an alloy. In some embodiments, the metal nanoparticles are a component of a catalyst layer of an MEA. In some cases, the metal nanoparticles are a component of a mixture that serves as a precursor to a catalyst layer. For example, the metal nanoparticles may be provided as mixture containing substantially only metal nanoparticles. In some cases, the metal nanoparticles are provided with an electronically conductive support material such as carbon particles. In some cases, the metal nanoparticles are provided in a composition comprising an electronically conductive support material and an ionically conductive matrix such as an ionomer.

Size of Metal Particles

The size of catalyst metal particles may be characterized by the diameter of a representative sphere of the metal particles. As used herein, a particle's diameter is a parameter that assumes that the particles are spherical, even if not all of them are in fact spherical. As an example, particle size can be determined by high resolution imaging with, e.g., a transmission electron microscope (TEM). Resulting micrographs can be analyzed to determine particle size. Using the number of particles in a micrograph and the total area of all particles in the micrograph, an area per particle can be determined, and a diameter of a spherical particle can be back calculated from that. In another example, a mean area of all particles is determined, and a diameter is calculated assuming the particles are spherical. In some embodiments, an image analysis process limits the size calculation to only those particles within a specified range of particle "circularity" or sphericity (e.g., 1=perfect circle or sphere and closer to 0=elongated polygon). For example, only particles having a circularity of about 0.3 or greater are considered in the size determination.

In certain embodiments, an arithmetic mean or other measure of central tendency (e.g., a median value) of the diameters of metal particles in a carbon oxide electrolyzer cathode catalyst is about 2-100 nm or about 3-5 nm. In certain embodiments, the mean diameter of the metal particles is about 2 to 100 nm, or about 2 to 50 nm, or about 2 to 10 nm, or about 3 to 5 nm.

Uniformity of Metal Particle Size

Metal catalyst particles have a distribution of sizes or diameters. In certain embodiments, the distribution is substantially uniform. In some embodiments, metal particles in a catalyst are characterized by a dispersity (sometimes referred to as a polydispersity index). The dispersity is a measure of the heterogeneity of sizes of particles in a mixture. A collection of objects is called uniform if the objects have the same size, shape, or mass. A sample of objects that have an inconsistent size, shape and mass distribution is called non-uniform.

The dispersity is calculated as the sample standard deviation divided by the mean particle diameter (i.e., s/μ). The sample standard deviation, s, is given by $$s = \sqrt{\frac{\sum (X - \overline{X})^2}{n - 1}},$$

where $\overline{X}$ is the mean particle size and n is the number of particles in the sample.

In some implementations, metal catalyst particles have a particle size dispersity of at most about 300%, or at most about 200%, or at most about 100%, or at most about 50%, or at most about 15%.

The inventors have observed that commercially available gold nanoparticle samples often have a wide range of particle sizes—e.g., in the range of from 3 to 75 nm—and consequently they are highly non-uniform. FIG. 1 shows a comparison of commercially sourced gold nanoparticles from Premetek of Cherry Hill, NJ (left panel) with gold particles in accordance with aspects of this disclosure (right panel). The gold nanoparticles shown in the left panel are highly non uniform, having diameters ranging from ~3-75 nm. While the gold nanoparticles shown in the right panel are much more uniform, having diameters ranging from ~3-5 nm.

Metal Loading

In various embodiments, catalysts contain metal nanoparticles in combination with electronically conductive support particles such as carbon particles. The metal nanoparticles may be attached to the support particles. The metal-support catalyst combination may be characterized by a loading of metal nanoparticles. The loading may be a mass fraction of the metal in a combination that contains only the metal and the support material (e.g., carbon). It does not include other common components of a catalyst layer such as ionomers. In certain embodiments, the catalyst particles have a metal loading of about 20-40%. In certain embodiments, the catalyst particles have a metal loading of at least about 30%. In some cases, such loadings are achieved with little or no metal particle aggregation.

The inventors have observed that commercially available gold nanoparticle compositions that have relatively high loadings (e.g., over 30%) have prominent irregularly shaped aggregations of gold particles.

Figure 2:
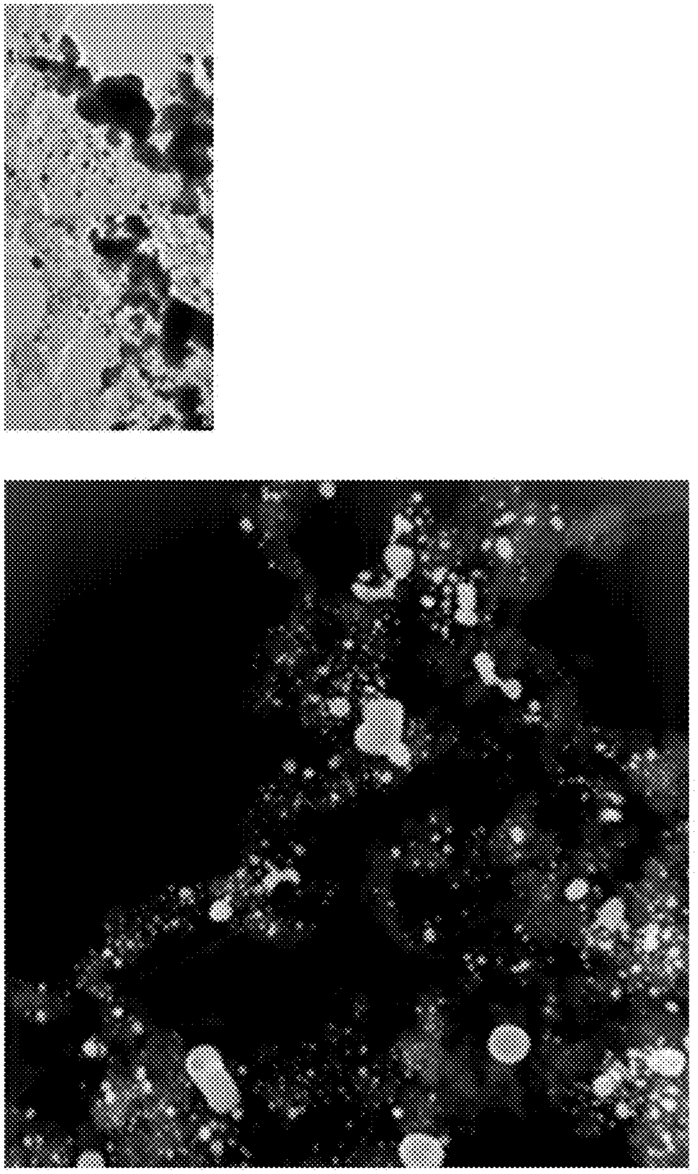
FIG. 2 presents two images of commercially sourced gold nanoparticles, with the gold nanoparticles in the left panel having relatively low loadings of nanoparticles, and those nanoparticles in the right panel having relatively higher loadings.

FIG. 2 shows two images of commercially sourced gold nanoparticles from Premetek. The gold nanoparticles in the left panel have relatively low loadings of nanoparticles, while those nanoparticles in the right panel have relatively higher loadings. As shown in the right panel, the gold nanoparticles provided at high loadings tend to aggregate or agglomerate into undesirable irregularly shaped clumps.

Shape of Metal Particles

In certain embodiments, catalyst metal nanoparticles have a generally spherical or circular shape. For example, metal nanoparticles may approach the shape of a true sphere or circle. In certain embodiments, the metal nanoparticles may have other shapes (generally) such as regular polyhedrons (e.g., cubes, octahedrons, dodecahedrons, etc.), ellipsoids or wires. In certain embodiments, catalyst metal particles are characterized by their sphericity or circularity, which is a measure of how spherical or circular an object is. The sphericity of a particle is defined as the ratio of the surface area of an equal-volume sphere to the actual surface area of the particle. In certain embodiments, at least about 50% of metal nanoparticles have a sphericity of at least about 80% or at least about 70% of the metal nanoparticles have a sphericity of at least about 90%. In certain embodiments, at least about 85% of metal nanoparticles in a catalyst have a sphericity of at least about 90%.

Figure 3:
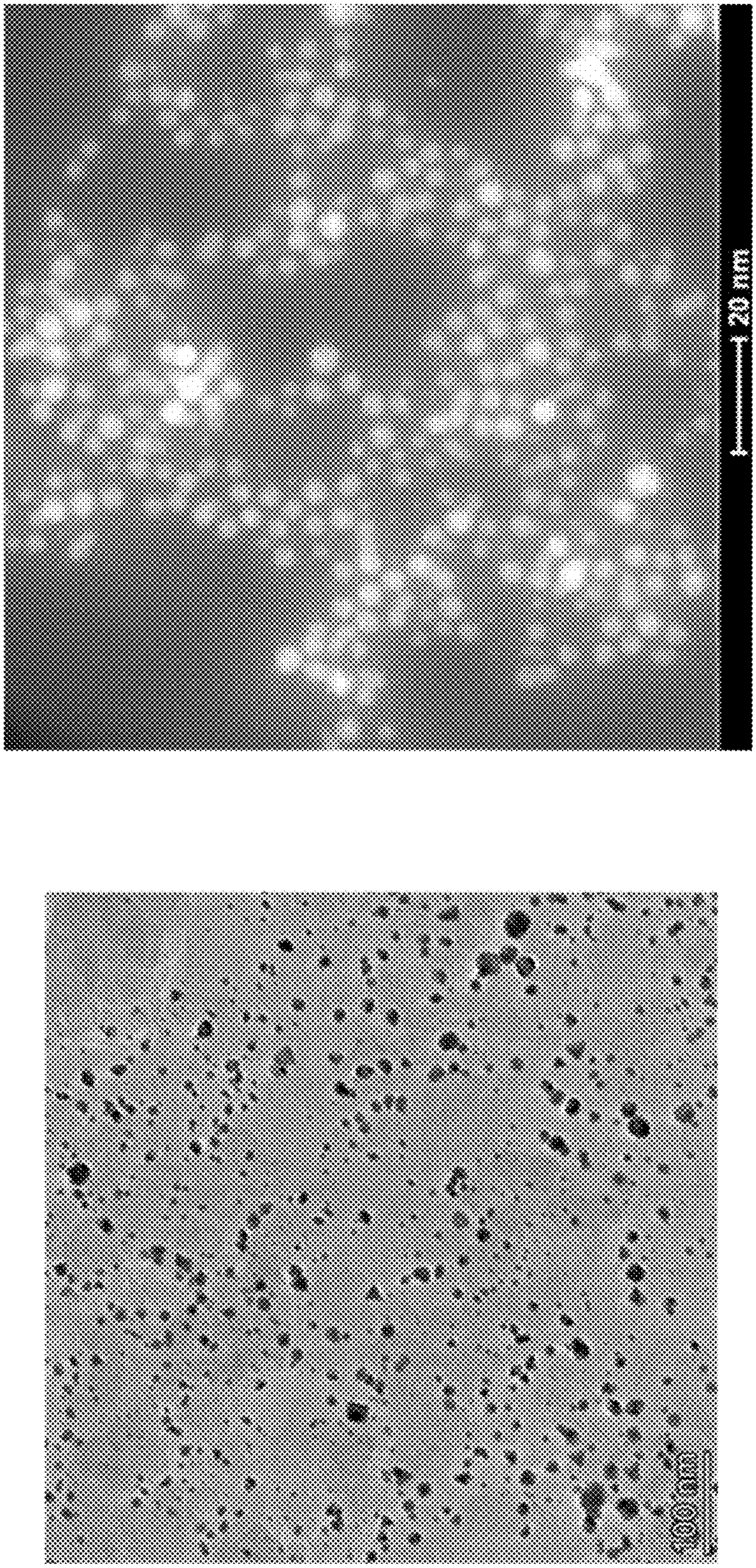
FIG. 3 shows a comparison of shapes of commercially sourced gold nanoparticles (left panel) with gold particles in accordance with certain embodiments of the present disclosure (right panel).

FIG. 3 shows a comparison of commercially sourced gold nanoparticles from Premetek (left panel) with gold particles in accordance with certain embodiments of the present disclosure (right panel). The gold nanoparticles shown in the left panel are highly non-spherical, having many non-spherical particles such as triangles, octahedrons, etc. In contrast, the gold nanoparticles shown in the right panel have a much more uniformly spherical shape.

Crystallinity of Metal Particles

In certain embodiments, many or most metal particles in a catalyst are single crystal nanoparticles. Single crystal particles are not polycrystalline. For example, they do not exhibit crystal twinning.

Catalyst metal particles in a composition such as catalyst layer may be characterized by a minimum fraction of the particles that are single crystalline. In some catalysts, at least about 20% of the metal particles are single crystal particles. In some catalysts, at least about 80% of the metal particles are single crystal particles.

Figure 4:
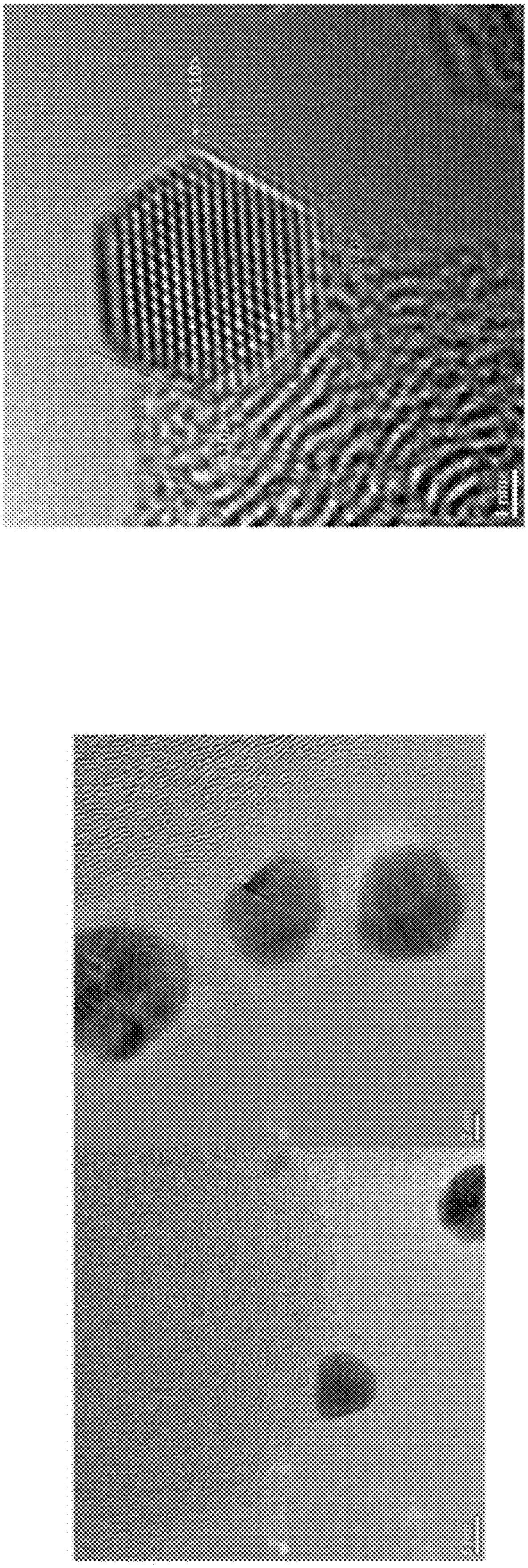
FIG. 4 shows a comparison of crystallinity of commercially sourced gold nanoparticles (left panel) with gold particles of certain embodiments of this disclosure (right panel).

FIG. 4 shows a comparison of commercially sourced gold nanoparticles from Premetek (left panel) with gold particles of certain embodiments of this disclosure (right panel). The gold nanoparticles shown in the left panel are highly polycrystalline (e.g., twinned), with clear grain boundaries. In contrast, the gold nanoparticle shown in the right panel is a single crystal nanoparticle.

Impurities in Metal Particles

In certain embodiments, the metal catalyst nanoparticles have few if any impurities. For example, metal catalyst nanoparticles (e.g., gold nanoparticles) contain about 200 ppm or less of boron or one or more alkali metals (e.g., sodium). In certain embodiments, metal catalyst nanoparticles (e.g., gold nanoparticles) contain about 20 ppm or less any transition metal or any other impurity. In some implementations, metal nanoparticles are fabricated using apparatus having few or no metal parts that contact the reactants that generate metal nanoparticles and/or the other components of a catalyst composition.

Carbon Particle Size

In certain embodiments, metal catalyst particles such as gold nanoparticles are provided on a substrate or support, which may be an electronically conductive substrate or support. In some cases, the conductive support is a particulate material. In some cases, metal catalyst particles are attached or bonded to the conductive support. In some cases, some or most of the conductive support particles have multiple catalyst particles attached. Conductive support particles having attached or bonded metal catalyst particles may be said to be decorated with the metal catalyst particles.

In some embodiments, electronically conductive support particles are carbon particles. Such particles may be made from carbon having any of various bonding types, allotropes, and/or chemical characteristics. In general, a carbon support may be an amorphous carbon or non-amorphous carbon. Examples of non-amorphous carbon include graphite or graphene-containing carbon, fullerenes, or any combination thereof. In certain embodiments, carbon black particles are used as a support. An example of a carbon black is Vulcan XC 72R (Cabot Corporation of Boston, MA). Any of these types of carbon particles may be decorated with gold or other metal catalyst particles.

Various parameters may characterize carbon black or other carbon support particles. Examples of these parameters include the carbon particle size, fraction of carbon particles decorated with metal catalyst particles, bonding between carbon and metal particles, and carbon porosity.

As with the catalyst particles, the size of support particles may be characterized in various ways. For example, the size of support particles may be characterized by the diameter of a representative sphere of support particles. In some cases, a support particle's diameter assumes that the particles are spherical, even if not all of them are in fact spherical.

In certain embodiments, carbon support particles have a mean or other measure of central tendency (e.g., a median value) diameter of about 20-50 nm or about 25-35 nm. In certain embodiments, the electrically conductive support particles have a mean diameter of about 10 to 100 nm, about 20-100 nm, or about 20 to 50 nm.

Coverage of Metal Catalyst Particles on Carbon Particles.

In some embodiments, all or nearly all support particles in a catalyst composition have at least one metal catalyst particle attached. In some embodiments, the minimum fraction of support particles having at least one attached metal catalyst particle is at least about 80% or at least about 90%.

Figure 5:
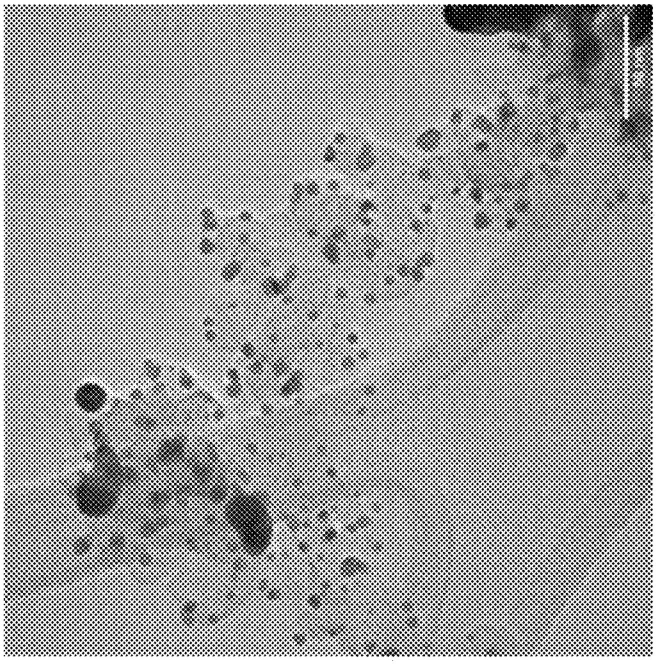
FIG. 5 contains images of commercially sourced gold decorated carbon particles (left panel) and gold decorated carbon particles in accordance with aspects of this disclosure (right panel).
Figure 5:
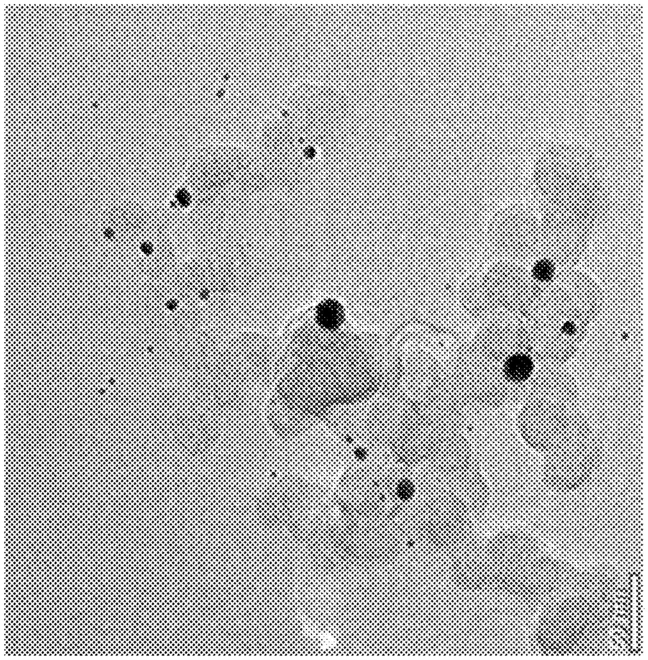

FIG. 5 contains images of commercially sourced gold decorated carbon particles from Premetek (left panel) and gold decorated carbon particles in accordance with aspects of this disclosure (right panel). As shown, the mixture shown in the left panel contains many carbon particles with little to no gold coverage. The coverage of gold on carbon is very inconsistent. By contrast, the mixture shown in the right panel has a much more consistent, uniform coverage of gold on carbon particles. No carbon particles are missing gold.

Bond Between Metal Particle and Carbon

Similarly, in some embodiments, all or nearly all metal catalyst particles in a catalyst composition are attached to a support particle. For example, the fraction of metal catalyst particles attached to a support particle is at least about 95% or at least about 98%.

In some cases, bonding between the metal catalyst particles and support particles is facilitated during fabrication of decorated particles by, e.g., using a ligand to change the surface energy of the catalyst particles to better adhere to the support particles. In some case, decorated particles are prepared by mechanically affixing metal particles to carbon particles by mixing colloidal metal particles with a solution containing the support particles.

FIG. 6 shows images of commercially sourced gold decorated carbon particles from Premetek (left panel) and gold decorated carbon particles in accordance with aspects of this disclosure (right panel). The mixture shown in the left panel contains many gold nanoparticles that are unattached to any carbon particles. By contrast, the mixture shown in the right panel has a much more consistent attachment of gold nanoparticles to carbon particles. Few if any gold particles are unattached to carbon particles.

Porosity of Carbon Particles

Support particles such as carbon particles may be characterized by their porosity. The porosity of support particles, and in turn a cathode layer, can impact the ability of gaseous reactants and products to enter and leave the cathode while removing water. However, the cathode layer should not be so porous that it causes the cathode's ionic and/or electrical resistance to degrade performance.

In certain embodiments, the porosity of the support particles is about 15% to about 85%, or about 25% to about 75%. In some embodiments, porosity is determined by a method such as mercury porosimetry or image analysis of TEM images. In certain embodiments, the pore volume per mass of the support particles is about 25 to 225 $cm^3$/100 g or about 50 to 200 $cm^3$/100 g.

Spacing Between Metal Catalyst Particles

In certain embodiments, catalyst metal particles are substantially evenly spaced on support particle surfaces. In such cases, there is a low probability of the metal catalyst particles irregularly aggregating on support particle surfaces. This propensity to be evenly spaced is a characteristic of a powder containing support particles with catalyst particles. The even spacing may be preserved in the final catalyst layer, which may contain an ionomer.

In certain embodiments, the even spacing between individual metal catalyst particles on a support particle is represented by a standard deviation or a dispersity of separation distances between nearest neighbor particles. For example, a dispersity of the spacing between the individual metal nanoparticles (nearest neighbors) is about 50% or less. The dispersity of spacing of metal nanoparticles on a support particle surface may be defined by the sample standard deviation divided by the mean separation distance between nearest neighbor nanoparticles ($s/\mu$).

Figure 7:
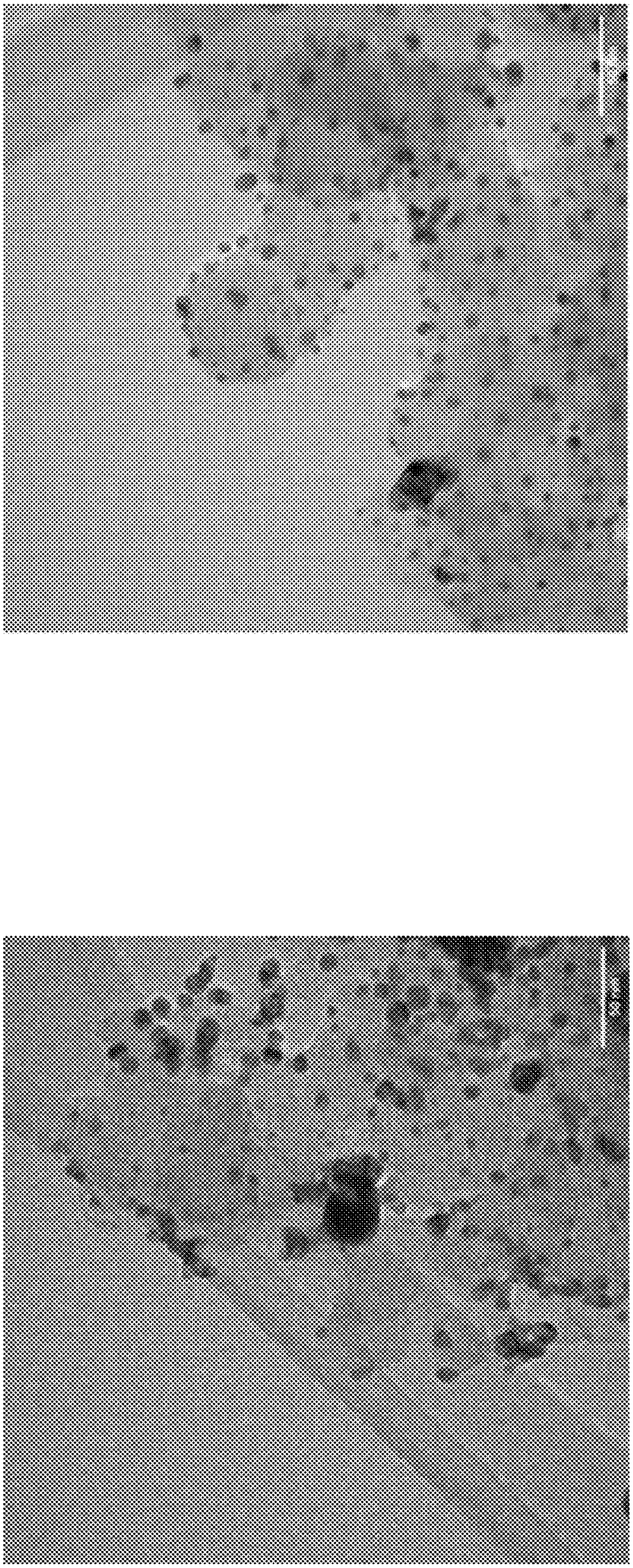
FIG. 7 contains images of commercially sourced gold decorated carbon particles (left panel) and gold decorated carbon particles in accordance with aspects of this disclosure (right panel). As shown in the left panel, gold nanoparticles are clustered closely and unevenly, with a high degree of aggregation on carbon particle surfaces. By contrast, the right panel shows gold nanoparticles that are well-spaced on carbon particle surfaces, with a low degree of irregular aggregation.

FIG. 7 contains images of commercially sourced gold decorated carbon particles (left panel) and gold decorated carbon particles in accordance with aspects of this disclosure (right panel). As shown in the left panel, gold nanoparticles are clustered closely and unevenly, with a high degree of aggregation on carbon particle surfaces. By contrast, the right panel shows gold nanoparticles that are well-spaced on carbon particle surfaces, with a low degree of irregular aggregation.

Ionomer Coating Uniformity

A catalyst layer for an MEA may contain not only electronically conductive support particles decorated with metal catalyst particles but also an ionically conductive material such as an anionic conductive polymer. In an MEA catalyst layer, all or substantially all the metal catalyst particles may contact an ionomer or other ionically conductive material. For example, within an ionomer matrix, at least about 50% of catalyst particles are coated (or in intimate contact) with the ionomer. In some embodiments, at least about 70% of catalyst particles are coated (or in intimate contact) with the ionomer.

Figure 8:
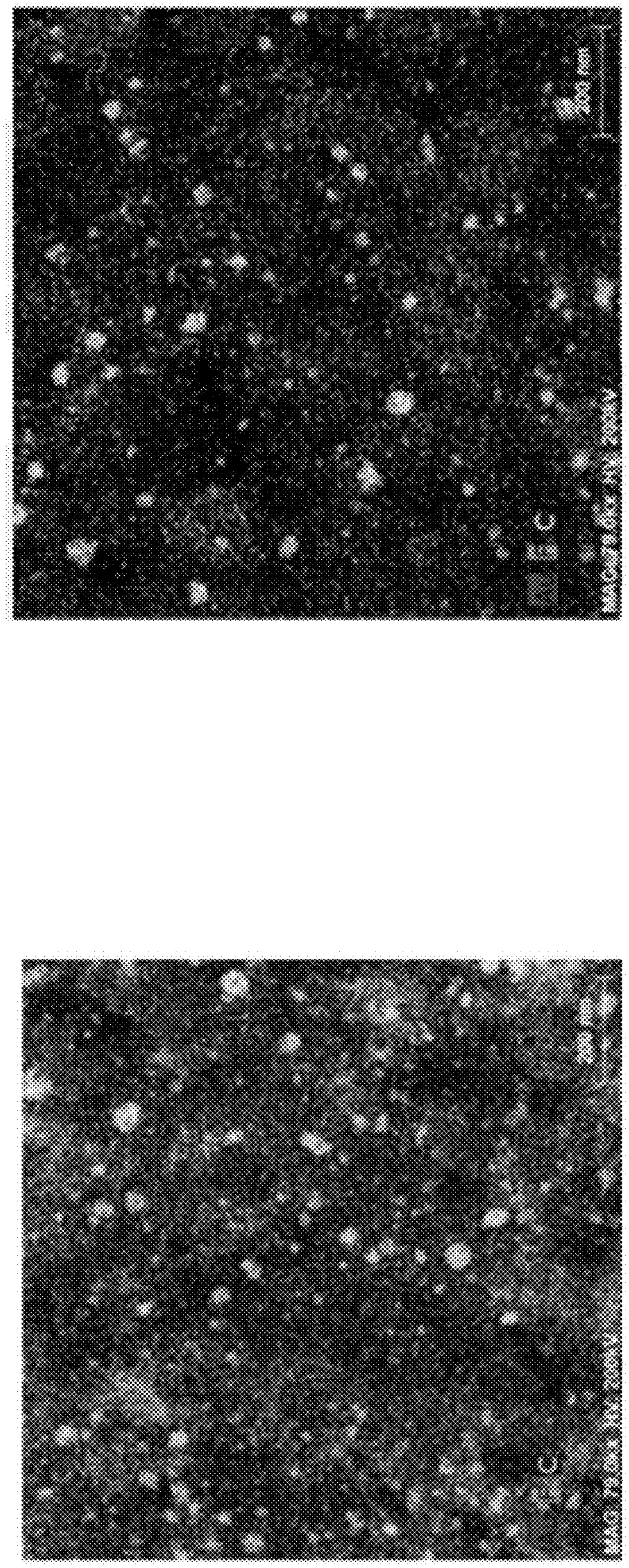
FIG. 8 contains images of gold decorated carbon particles in an ionomer matrix.

FIG. 8 contains images of gold decorated carbon particles in an ionomer matrix. As shown in the left panel, the ionomer is distributed inconsistently, it coats the gold particles non uniformly, and it does not disperse well. By contrast, as shown in the right panel, the ionomer creates a substantially uniform coating or distribution in all areas of a catalyst layer. The gold-carbon particles disperse well within the ionomer.

While the examples and embodiments described herein generally refer to cathode catalysts for carbon oxide electrolyzers, the catalysts and other compositions described herein may be employed in other contexts such as in MEAS for other electrochemical systems such as fuel cells and electrolyzers of various substances other than carbon oxides; e.g., for water electrolyzers.

Further, while the examples and embodiments described herein generally refer to gold particles as catalysts, other catalysts may be employed depending on the electrode and application. For example, noble metals other than gold may be employed in electrolyzer cathodes. Such other noble metals include platinum, rhenium, ruthenium, rhodium, palladium, silver, osmium, and iridium. Such metals may be appropriate for reducing carbon dioxide to carbon monoxide. In some embodiments, electrolyzer cathodes may employ other metal catalysts such as copper, vanadium, chromium, manganese, iron, cobalt, nickel, zirconium, niobium, and molybdenum. Such metals may be appropriate for reducing a carbon oxide to a hydrocarbon (e.g., methane and ethylene), formic acid, alcohols, aldehydes, etc.

The supported metal particle catalyst compositions may be prepared by batch or flow through processes. The methods involve forming metal nanoparticles by mixing a metal precursor solution with a capping agent solution to form a first mixture, then adding a reducing agent to reduce the metal precursor and form metal nanoparticles. The metal nanoparticles are then added to a solution containing suspended support particles. The solution is mixed allowing the metal nanoparticles to absorb adsorb onto the support particles.

Any appropriate metal-containing compound that can be reduced to form the elemental metal may be used. To synthesize gold nanoparticles, examples of metal precursors include gold monoiodide (AuI), gold(I) bromide (AuBr), gold(I) chloride (AuCl), gold(I) fluoride (AuF), gold trichloride ($AuCl_3$), hydrogen tetrachloroaurate(III) ($HAuCl_4$), gold(I) sulfide aurotioprol, $Au_m(SCH_2CH_2Ph)_n$, AuCl(oleylamine), AuCl(octadecylamine), gold(III) Acetate, and gold (III) nitrate. Solid precursors may be dissolved in ultrapure water or other appropriate solvent. For synthesis of nanoparticles of other metals, an appropriate metal-containing precursor may be used. For example, silver nitrate ($AgNO_3$) may be used to synthesize silver nanoparticles and copper nitrate ($Cu(NO_3)_2$) may be used to synthesize copper nanoparticles.

Capping agents facilitate synthesis of metal nanoparticles having controlled sizes and well-defined shapes. Examples include citratric acid, sodium citrate, cetrimonium bromide (CTAB), cetrimonium chloride (CTAC), primary amines with short alkyl ligands including hexylamine, nonylamine, and dodecylamine, carboxylic acids, polyethylene glycol (PEG), polyvinyl alcohol, polyvinylpyrrolidone, thiols including dodecanethiol, thiolates, sodium alkyl sulfates including sodium dodecyl sulfate, polysorbates such as Tween 80®, phosphorous ligands, dendrimers, heterocyclic compounds, thiolate end-capped polystyrene, thiolate poly (N-isopropylacrylamide) (PNIPAM), thiolate poly(vinyl pyridine) (PVP), five arm polyethylene glycol-b-poly(ε-caprolactone) (PEG-b-PCL) star block copolymer, polypeptides with disulfide termini, and tetraoctylammonium bromide (TOAB).

Examples of reducing agents include sodium borohydride, potassium borohydride, ascorbic acid ascorbate, polyols, tannic acid, amines including hydroxylamine, aldehydes including formaldehyde, thiols, hydrazine, phosphonic acid, thiosulfates, borohydrides, and aminoboranes.

Examples of support particles are provided above and include carbon black particles, boron-doped diamond, and fluorine-doped tin oxide.

In an example of a batch process, a metal precursor (e.g., $HAuCl_4$ in high purity water) is mixed with a capping agent (e.g., trisodium citrate in high purity water) in a vessel and the mixture stirred. A reducing agent solution (e.g., sodium borohydride) is added and the mixture stirred for several hours. The size of the metal particles may be monitored by UV-visible spectroscopy. The mixture is then pumped into a second vessel including pre-dissolved and diluted carbon support (e.g., Vulcan carbon) and stirred for several days. The supported material may be recovered by decanting and centrifugation.

Figure 9:
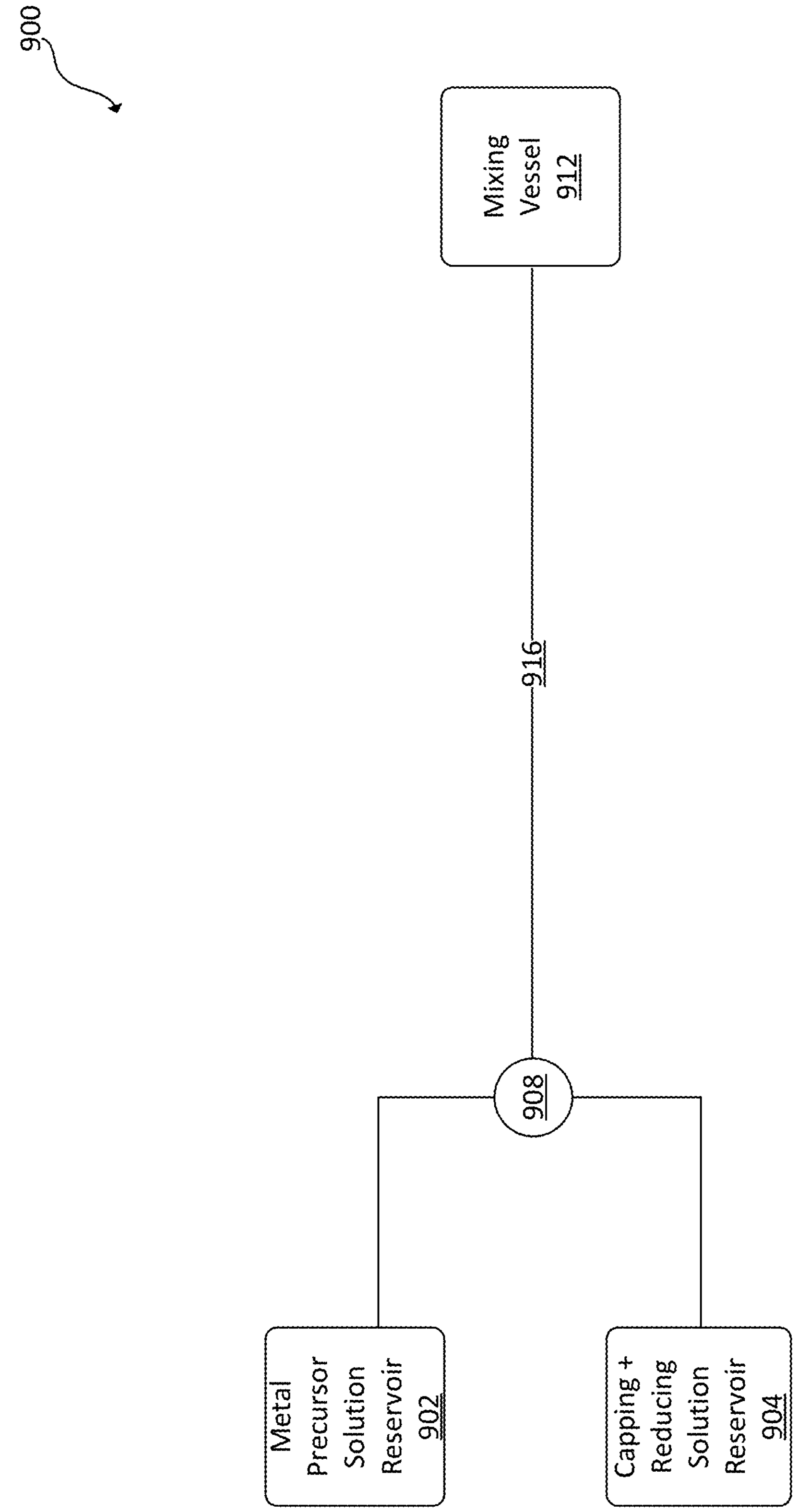
FIG. 9 shows a schematic diagram of an example of a flow through system.

FIG. 9 shows a schematic diagram of an example of a flow through system. The system 900 includes a metal precursor solution reservoir 902, a capping and reducing solution reservoir 904. The metal precursor and solution containing capping and reducing agents are controllably pumped to junction 908 for mixing. Examples of junctions include Y-junctions, T-junctions, and cable-type junctions followed by a short tubing section that houses a static mixer. The metal nanoparticle/capping solution mixture flows in channel 914 to junction 910. The mixture is flowed through channel 916, in which the metal precursor and reducing solution react for sufficient time to form metal nanoparticles. Once the metal nanoparticles are formed, they can be transferred to a mixing vessel 912 for mixing with support particles in a suspended solution.

In the example of FIG. 9, the metal nanoparticles are flowed directly to the mixing vessel 912. In alternate embodiments, they may be first collected and separately added to a mixing vessel, with a flow synthesis used to prepare only the metal nanoparticles.

In some embodiments in which the metal nanoparticles are mixed with the support particles without pre-collection, the support particle suspended solution may be added to the mixing vessel from a support particle suspended solution reservoir (not shown) during the mixing process. This can be useful to prevent agglomeration.

To scale up production, multiple parallel channels from each reservoir and multiple junctions may be used.

Parameters that may be used to control particle size and particle size distribution include flow rates, residence time, ratio of capping agent to metal precursor, and concentration of the reducing agent. Residence time may be controlled in part by the lengths of channels 914 and 916. In some embodiments, serpentine channels are used to facilitate long channels. The channels may be provided in a flow field plate. Example channel lengths are 10 meters to 100 meters. Example diameters are 1 mm to 25 mm.

Residence times will vary according to the size of the metal nanoparticle and the channel dimensions. Example residence times are from 1-10 minutes. A ratio of capping agent to metal precursor depends on the capping agent used. Example molar ratios are 2:1 to 20:1. Example reducing and capping agent concentrations are 1 mmol/L to 100 mmol/L. Example metal precursor concentration is 1 mmol/L to 100 mmol/L. Higher concentrations generate larger nanoparticles for the same residence time. Example flow rates are 10 mL/min to 1000 mL/min for the metal precursor solution. Example flow rates for the reducing and capping agent solution are 0.1 to 4 mL/min.

Metal nanoparticle size can be monitored using in-line UV-visible spectroscopy or dynamic light scattering to help determine parameter values for a particular size and size distribution.

Carbon Oxide Electrolyzer System Embodiments

Figure 10:
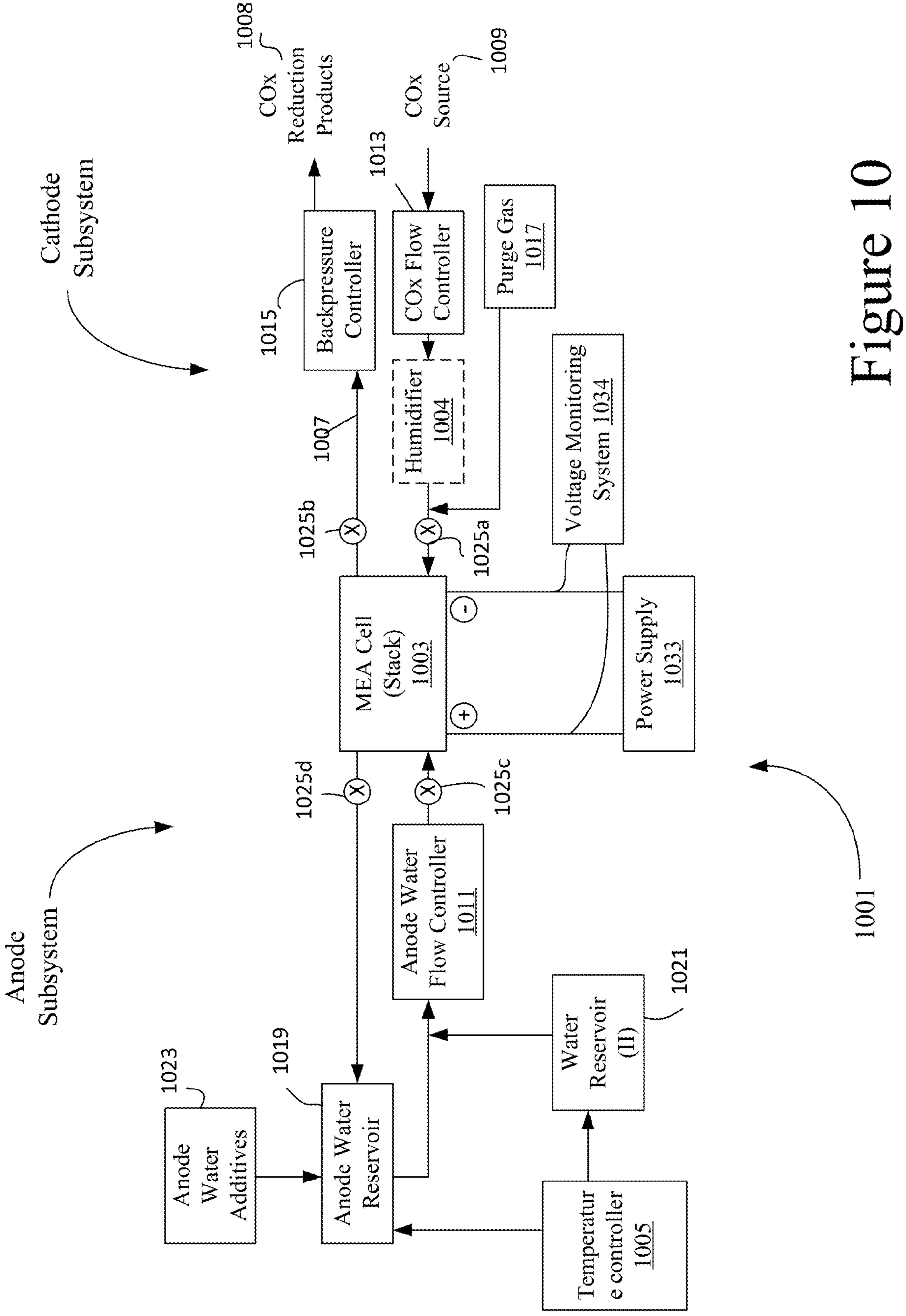
FIG. 10 depicts an example system for a carbon oxide reduction reactor that may include a cell comprising a MEA (membrane electrode assembly).

FIG. 10 depicts an example system 1001 for a carbon oxide reduction reactor 1003 that may include a cell comprising a MEA (membrane electrode assembly). The reactor may contain multiple cells or MEAs arranged in a stack. System 1001 includes an anode subsystem that interfaces with an anode of reduction reactor 1003 and a cathode subsystem that interfaces with a cathode of reduction reactor 1003. System 1001 is an example of a system that may be used with or to implement any of the methods or operating conditions described above.

As depicted, the cathode subsystem includes a carbon oxide source 1009 configured to provide a feed stream of carbon oxide to the cathode of reduction reactor 1003, which, during operation, may generate an output stream that includes product(s) of a reduction reaction at the cathode. The product stream may also include unreacted carbon oxide and/or hydrogen. See 1008.

The carbon oxide source 1009 is coupled to a carbon oxide flow controller 1013 configured to control the volumetric or mass flow rate of carbon oxide to reduction reactor 1003. One or more other components may be disposed on a flow path from flow carbon oxide source 1009 to the cathode of reduction reactor 1003. For example, an optional humidifier 1004 may be provided on the path and configured to humidify the carbon oxide feed stream. Humidified carbon oxide may moisten one or more polymer layers of an MEA and thereby avoid drying such layers. Another component that may be disposed on the flow path is a purge gas inlet coupled to a purge gas source 1017. In certain embodiments, purge gas source 1017 is configured to provide purge gas during periods when current is paused to the cell(s) of reduction reactor 1003. In some implementations, flowing a purge gas over an MEA cathode facilitates recovery of catalyst activity and/or selectivity. Examples of purge gases include carbon dioxide, carbon monoxide, hydrogen, nitrogen, argon, helium, oxygen, and mixtures of any two or more of these.

During operation, the output stream from the cathode flows via a conduit 1007 that connects to a backpressure controller 1015 configured to maintain pressure at the cathode side of the cell within a defined range (e.g., about 50 to 800 psig, depending on the system configuration). The output stream may provide the reaction products 1008 to one or more components (not shown) for separation and/or concentration.

In certain embodiments, the cathode subsystem is configured to controllably recycle unreacted carbon oxide from the outlet stream back to the cathode of reduction reactor 1003. In some implementations, the output stream is processed to remove reduction product(s) and/or hydrogen before recycling the carbon oxide. Depending upon the MEA configuration and operating parameters, the reduction product(s) may be carbon monoxide, hydrogen, hydrocarbons such as methane and/or ethylene, oxygen-containing organic compounds such as formic acid, acetic acid, and any combinations thereof. In certain embodiments, one or more components, not shown, for removing water from the product stream are disposed downstream from the cathode outlet. Examples of such components include a phase separator configured to remove liquid water from the product gas stream and/or a condenser configured to cool the product stream gas and thereby provide a dry gas to, e.g., a downstream process when needed. In some implementations, recycled carbon oxide may mix with fresh carbon oxide from source 1009 upstream of the cathode.

As depicted in FIG. 10, an anode subsystem is configured to provide an anode feed stream to an anode side of the carbon oxide reduction reactor 1003. In certain embodiments, the anode subsystem includes an anode water source, not shown, configured to provide fresh anode water to a recirculation loop that includes an anode water reservoir 1019 and an anode water flow controller 1011. The anode water flow controller 1011 is configured to control the flow rate of anode water to or from the anode of reduction reactor 1003. In the depicted embodiment, the anode water recirculation loop is coupled to components for adjusting the composition of the anode water. These may include a water reservoir 1021 and/or an anode water additives source 1023. Water reservoir 1021 is configured to supply water having a composition that is different from that in anode water reservoir 1019 (and circulating in the anode water recirculation loop). In one example, the water in water reservoir 1021 is pure water that can dilute solutes or other components in the circulating anode water. Pure water may be conventional deionized water even ultrapure water having a resistivity of, e.g., at least about 15 MOhm-cm or over 18.0 MOhm-cm. Anode water additives source 1023 is configured to supply solutes such as salts and/or other components to the circulating anode water.

During operation, the anode subsystem may provide water or other reactant to the anode of reactor 1003, where it at least partially reacts to produce an oxidation product such as oxygen. The product along with unreacted anode feed material is provided in a reduction reactor outlet stream. Not shown in FIG. 10 is an optional separation component that may be provided on the path of the anode outlet stream and configured to concentrate or separate the oxidation product from the anode product stream.

Other control features may be included in system 1001. For example, a temperature controller may be configured to heat and/or cool the carbon oxide reduction reactor 1003 at appropriate points during its operation. In the depicted embodiment, a temperature controller 1005 is configured to heat and/or cool anode water provided to the anode water recirculation loop. For example, the temperature controller 1005 may include or be coupled to a heater and/or cooler that may heat or cool water in anode water reservoir 1019 and/or water in reservoir 1021. In some embodiments, system 1001 includes a temperature controller configured to directly heat and/or cool a component other than an anode water component. Examples of such other components in the cell or stack and the carbon oxide flowing to the cathode.

Depending upon the phase of the electrochemical operation, including whether current is paused to carbon oxide reduction reactor 1003, certain components of system 1001 may operate to control non-electrical operations. For example, system 1001 may be configured to adjust the flow rate of carbon oxide to the cathode and/or the flow rate of anode feed material to the anode of reactor 1003. Components that may be controlled for this purpose may include carbon oxide flow controller 1013 and anode water controller 1011.

In addition, depending upon the phase of the electrochemical operation including whether current is paused, certain components of system 1001 may operate to control the composition of the carbon oxide feed stream and/or the anode feed stream. For example, water reservoir 1021 and/or anode water additives source 1023 may be controlled to adjust the composition of the anode feed stream. In some cases, additives source 1023 may be configured to adjust the concentration of one or more solutes such as one or more salts in an aqueous anode feed stream.

In some cases, a temperature controller such controller 1005 is configured to adjust the temperature of one or more components of system 1001 based on a phase of operation. For example, the temperature of cell 1003 may be increased or decreased during break-in, a current pause in normal operation, and/or storage.

In some embodiments, a carbon oxide electrolytic reduction system is configured to facilitate removal of a reduction cell from other system components. This may be useful with the cell needs to be removed for storage, maintenance, refurbishment, etc. In the depicted embodiments, isolation valves 1025*a* and 1025*b* are configured to block fluidic communication of cell 1003 to a source of carbon oxide to the cathode and backpressure controller 1015, respectively. Additionally, isolation valves 1025*c* and 1025*d* are configured to block fluidic communication of cell 1003 to anode water inlet and outlet, respectively.

The carbon oxide reduction reactor 1003 may also operate under the control of one or more electrical power sources and associated controllers. See, block 1033. Electrical power source and controller 1033 may be programmed or otherwise configured to control current supplied to and/or to control voltage applied to the electrodes in reduction reactor 1003. The current and/or voltage may be controlled to execute the current schedules and/or current profiles described elsewhere herein. For example, electrical power source and controller 1033 may be configured to periodically pause current applied to the anode and/or cathode of reduction reactor 1003. Any of the current profiles described herein may be programmed into power source and controller 1033.

In certain embodiments, electric power source and controller 1033 performs some but not all the operations necessary to implement desired current schedules and/or profiles in the carbon oxide reduction reactor 1003. A system operator or other responsible individual may act in conjunction with electrical power source and controller 1033 to fully define the schedules and/or profiles of current applied to reduction reactor 1003. For example, an operator may institute one or more current pauses outside the set of current pauses programmed into power source and controller 1033.

In certain embodiments, the electrical power source and controller acts in concert with one or more other controllers or control mechanisms associated with other components of system 1001. For example, electrical power source and controller 1033 may act in concert with controllers for controlling the delivery of carbon oxide to the cathode, the delivery of anode water to the anode, the addition of pure water or additives to the anode water, and any combination of these features. In some implementations, one or more controllers are configured to control or operate in concert to control any combination of the following functions: applying current and/or voltage to reduction cell 1003, controlling backpressure (e.g., via backpressure controller 1015), supplying purge gas (e.g., using purge gas component 1017), delivering carbon oxide (e.g., via carbon oxide flow controller 1013), humidifying carbon oxide in a cathode feed stream (e.g., via humidifier 1004), flow of anode water to and/or from the anode (e.g., via anode water flow controller 1011), and anode water composition (e.g., via anode water source 1005, pure water reservoir 1021, and/or anode water additives component 1023).

In the depicted embodiment, a voltage monitoring system 1034 is employed to determine the voltage across an anode and cathode of an MEA cell or across any two electrodes of a cell stack, e.g., determining the voltage across all cells in a multi-cell stack. The voltage determined in this way can be used to control the cell voltage during a current pause, inform the duration of a pause, etc. In certain embodiments, voltage monitoring system 1034 is configured to work in concert with power supply 1033 to cause reduction cell 1003 to remain within a specified voltage range. For example, power supply 1033 may be configured to apply current and/or voltage to the electrodes of reduction cell 1003 in a way that maintains the cell voltage within a specified range during a current pause. If, for example during a current pause, the cell's open circuit voltage deviates from a defined range (as determined by voltage monitoring system 1034), power supply may be configured to apply current or voltage to the electrodes to maintain the cell voltage within the specified range.

An electrolytic carbon oxide reduction system such as that depicted in FIG. 10 may employ a control system that includes one or more controllers and one or more controllable components such as pumps, sensors, dispensers, valves, and power supplies. Examples of sensors include pressure sensors, temperature sensors, flow sensors, conductivity sensors, voltmeters, ammeters, electrolyte composition sensors including electrochemical instrumentation, chromatography systems, optical sensors such as absorbance measuring tools, and the like. Such sensors may be coupled to inlets and/or outlets of an MEA cell (e.g., in a flow field), in a reservoir for holding anode water, pure water, salt solution, etc., and/or other components of an electrolytic carbon oxide reduction system.

Among the various functions that may be controlled by one or more controllers are: applying current and/or voltage to a carbon oxide reduction cell, controlling backpressure on an outlet from a cathode on such cell, supplying purge gas to a cathode inlet, delivering carbon oxide to the cathode inlet, humidifying carbon oxide in a cathode feed stream, flowing anode water to and/or from the anode, and controlling anode feed composition. Any one or more of these functions may have a dedicated controller for controlling its function alone. Any two or more of these functions may share a controller. In some embodiments, a hierarchy of controllers is employed, with at least one master controller providing instructions to two or more component controllers. For example, a system may comprise a master controller configured to provide high level control instructions to (i) a power supply to a carbon oxide reduction cell, (ii) a cathode feed stream flow controller, and (iii) an anode feed stream flow controller. For example, a programmable logic controller (PLC) may be used to control individual components of the system.

In certain embodiments, a control system is configured to apply current to a carbon oxide reduction cell comprising an MEA in accordance with a current schedule, which may have any of the characteristics described herein. For example, the current schedule may provide periodic pauses in the applied current. In some cases, the control system provides the current pauses with defined profiles such as ramps and/or step changes as described herein.

In certain embodiments, a control system is configured to control the flow rate of one or more feed streams (e.g., a cathode feed stream such as a carbon oxide flow and an anode feed stream) in concert with a current schedule. For example, the flow of carbon oxide or a purge gas may be turned on, turned off, or otherwise adjusted when current applied to an MEA cell is paused.

In certain embodiments, a control system may be configured to implement a recovery sequence as described herein. Such control system may be configured to pause or reduce current, flow a recovery gas, flow water or other liquid, dry the cathode, resume normal operation, or any combination thereof. The controller may be configured to control the initiation of a recovery sequence, control the duration of any operation in a recovery sequence, etc.

A controller may include any number of processors and/or memory devices. The controller may contain control logic such software or firmware and/or may execute instructions provided from another source. A controller may be integrated with electronics for controlling operation the electrolytic cell before, during, and after reducing a carbon oxide. The controller may control various components or subparts of one or multiple electrolytic carbon oxide reduction systems. The controller, depending on the processing requirements and/or the type of system, may be programmed to control any of the processes disclosed herein, such as delivery of gases, temperature settings (e.g., heating and/or cooling), pressure settings, power settings (e.g., electrical voltage and/or current delivered to electrodes of an MEA cell), liquid flow rate settings, fluid delivery settings, and dosing of purified water and/or salt solution. These controlled processes may be connected to or interfaced with one or more systems that work in concert with the electrolytic carbon oxide reduction system.

In various embodiments, a controller comprises electronics having various integrated circuits, logic, memory, and/or software that receive instructions, issue instructions, control operations described herein. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a process on one or more components of an electrolytic carbon oxide reduction system. The operational parameters may, in some embodiments, be part of a recipe defined by process engineers to accomplish one or more processing steps during generation of a particular reduction product such as carbon monoxide, hydrocarbons, and/or other organic compounds.

The controller, in some implementations, may be a part of or coupled to a computer that is integrated with, coupled to the system, otherwise networked to the system, or a combination thereof. For example, the controller may utilize instructions stored remotely (e.g., in the "cloud") and/or execute remotely. The computer may enable remote access to the system to monitor current progress of electrolysis operations, examine a history of past electrolysis operations, examine trends or performance metrics from a plurality of electrolysis operations, to change parameters of current processing, to set processing steps to follow a current processing, or to start a new process. In some examples, a remote computer (e.g. a server) can provide process recipes to a system over a network, which may include a local network or the internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations.

The controller may be distributed, such as by comprising one or more discrete controllers that are networked together and working towards a common purpose, such as applying current to an MEA cell and other process controls described herein. An example of a distributed control system for such purposes includes one or more processors on a system for electrolytically reducing a carbon oxide and one or more processors located remotely (such as at the platform level or as part of a remote computer) that combine to control a process.

Controllers and any of various associated computational elements including processors, memory, instructions, routines, models, or other components are sometimes described or claimed as "configured to" perform a task or tasks. In such contexts, the phrase "configured to" is used to denote structure by indicating that the component includes structure (e.g., stored instructions, circuitry, etc.) that performs a task or tasks during operation. As such, a controller and/or associated component can be said to be configured to perform the task even when the specified component is not necessarily currently operational (e.g., is not on).

Controllers and other components that are "configured to" perform an operation may be implemented as hardware—for example, circuits, memory storing program instructions executable to implement the operation, etc. Additionally, controllers and other components "configured to" perform an operation may be implemented as hardware that is manipulated by software and/or firmware (e.g., an FPGA or a general-purpose processor executing software) to operate in manner that is capable of performing the recited task(s). Additionally, "configured to" can refer to one or more memories or memory elements storing computer executable instructions for performing the recited task(s). Such memory elements may include memory on a computer chip having processing logic.

Non-computation elements such as reactors, electrolyzers, membrane assemblies, layers, and catalyst particles may also be "configured" to perform certain functions. In such contexts, the phrase "configured to" indicate that the referenced structure has one or more features that allow the function to be performed. Examples of such features include physical and/or chemical properties such as dimensions, composition, porosity, etc.

MEA Embodiments

MEA Overview

In various embodiments, an MEA contains an anode layer, a cathode layer, electrolyte, and optionally one or more other layers. The layers may be solids and/or gels. The layers may include polymers such as ion-conducting polymers.

When in use, the cathode of an MEA promotes electrochemical reduction of $CO_x$ by combining three inputs: $CO_x$, ions (e.g., protons or hydroxide ions) that chemically react with $CO_x$, and electrons. The reduction reaction may produce CO, hydrocarbons, and/or hydrogen and oxygen-containing organic compounds such as methanol, ethanol, and acetic acid. When in use, the anode of an MEA promotes an electrochemical oxidation reaction such as electrolysis of water to produce elemental oxygen and protons. The cathode and anode may each contain catalysts to facilitate their respective reactions.

During operation of an MEA, ions move through a polymer-electrolyte, while electrons flow from an anode, through an external circuit, and to a cathode. In some embodiments, liquids and/or gas move through or permeates the MEA layers. This process may be facilitated by pores in the MEA.

The compositions and arrangements of layers in the MEA may promote high yield of a $CO_x$ reduction products. To this end, the MEA may facilitate any one or more of the following conditions: (a) minimal parasitic reduction reactions (non-$CO_x$ reduction reactions) at the cathode; (b) low loss of $CO_x$ reactants to the anode or elsewhere in the MEA; (c) physical integrity of the MEA during the reaction (e.g., the MEA layers remain affixed to one another); (d) prevent $CO_x$ reduction product cross-over; (e) prevent oxidation product (e.g., $O_2$) cross-over; (f) a suitable environment at the cathode for the reduction reaction; (g) a pathway for desired ions to travel between cathode and anode while blocking undesired ions; and (h) low voltage operation.

COx Reduction Considerations

Polymer-based membrane assemblies such as MEAS have been used in various electrolytic systems such as water electrolyzers and in various galvanic systems such as fuel cells. However, $CO_x$ reduction presents problems not encountered, or encountered to a lesser extent, in water electrolyzers and fuel cells.

For example, for many applications, an MEA for $CO_x$ reduction requires a lifetime on the order of about 50,000 hours or longer (approximately five years of continuous operation), which is significantly longer than the expected lifespan of a fuel cell for automotive applications; e.g., on the order of 5,000 hours. And for various applications, an MEA for $CO_x$ reduction employs electrodes having a relatively large surface area by comparison to MEAs used for fuel cells in automotive applications. For example, MEAs for $CO_x$ reduction may employ electrodes having surface areas (without considering pores and other nonplanar features) of at least about 500 $cm^2$.

$CO_x$ reduction reactions may be implemented in operating environments that facilitate mass transport of particular reactant and product species, as well as to suppress parasitic reactions. Fuel cell and water electrolyzer MEAs often cannot produce such operating environments. For example, such MEAs may promote undesirable parasitic reactions such as gaseous hydrogen evolution at the cathode and/or gaseous $CO_2$ production at the anode.

In some systems, the rate of a $CO_x$ reduction reaction is limited by the availability of gaseous $CO_x$ reactant at the cathode. By contrast, the rate of water electrolysis is not significantly limited by the availability of reactant: liquid water tends to be easily accessible to the cathode and anode, and electrolyzers can operate close to the highest current density possible.

MEA Configurations

In certain embodiments, an MEA has a cathode layer, an anode layer, and a polymer electrolyte membrane (PEM) between the anode layer and the cathode layer. The polymer electrolyte membrane provides ionic communication between the anode layer and the cathode layer, while preventing electronic communication, which would produce a short circuit. The cathode layer includes a reduction catalyst and, optionally, an ion-conducting polymer (sometimes called an ionomer). The cathode layer may also include an electron conductor and/or an additional ion conductor. The anode layer includes an oxidation catalyst and, optionally, an ion-conducting polymer. The anode layer may also include an electron conductor and/or an additional ion conductor. The PEM also includes an ion-conducting polymer. In certain embodiments, the MEA has a cathode buffer layer between the cathode layer and the polymer electrolyte membrane. The cathode buffer also includes an ion-conducting polymer.

The ion-conducting polymers in the PEM, the cathode, the anode, and the cathode buffer layer, if present, may each be different from one another in composition, conductivity, molecular weight, or other property. In some cases, two or more of these polymers are identical. For example, the ion-conducting polymer in the cathode and cathode buffer layer may be identical.

In certain embodiments, the MEA has an anode buffer layer between the anode layer and the polymer electrolyte membrane. The anode buffer also includes an ion-conducting polymer, which may have the same properties as any of the other ion-conducting polymers (e.g., the ion-conducting polymer in the anode). Or, the ion-conducting layer of the anode may be different from every other ion-conducting layer in the MEA.

In connection with certain MEA designs, there are three available classes of ion-conducting polymers: anion-conductors, cation-conductors, and mixed cation-and-anion-conductors. In certain embodiments, at least two of the first, second, third, fourth, and fifth ion-conducting polymers are from different classes of ion-conducting polymers.

Ion-Conducting Polymers for MEA Layers

The term "ion-conducting polymer" or "ionomer" is used herein to describe a polymer that conducts ions (anions and/or cations) is to say that the material is an ion-conducting material or ionomer. In certain embodiments, an MEA contains one or more ion-conducting polymers having a specific conductivity of about 1 mS/cm or greater for anions and/or cations. The term "anion-conductor" describes an ion-conducting polymer that conducts anions primarily (although there will still be some small amount of cation conduction) and has a transference number for anions greater than about 0.85 at around 100 micrometers thickness. The terms "cation-conductor" and/or "cation-conducting polymer" describe an ion-conducting polymer that conducts cations primarily (e.g., there can still be an incidental amount of anion conduction) and has a transference number for cations greater than approximately 0.85 at about 100 micrometers thickness. For an ion-conducting polymer that is described as conducting both anions and cations (a "cation-and-anion-conductor"), neither the anions nor the cations have a transference number greater than approximately 0.85 or less than approximately 0.15 at about 100 micrometers thickness. Examples of ion-conducting polymers of each class are provided in the below Table 1.

Ion-Conducting Polymers

| Class | Description | Common Features | Examples |
|---|---|---|---|
| A. Anion-conducting | Greater than approximately 1 mS/cm specific conductivity for anions, which have a transference number greater than approximately 0.85 at around 100 micron thickness | Positively charged functional groups are covalently bound to the polymer backbone | aminated tetramethyl polyphenylene; poly(ethylene-co-tetrafluoroethylene)-based quaternary ammonium polymer; quaternized polysulfone |
| B. Conducts both anions and cations | Greater than approximately 1 mS/cm conductivity for ions (including both cations and anions), which have a transference number between approximately 0.15 and 0.85 at around 100 micron thickness | Salt is soluble in the polymer and the salt ions can move through the polymer material | polyethylene oxide; polyethylene glycol; poly(vinylidene fluoride); polyurethane |
| C. Cation-conducting | Greater than approximately 1 mS/cm specific conductivity for cations, which have a transference number greater than approximately 0.85 at around 100 micron thickness | Negatively charged functional groups are covalently bound to the polymer backbone | perfluorosulfonic acid polytetrafluoroethylene co-polymer; sulfonated poly(ether ketone); poly(styrene sulfonic acid-co-maleic acid) |

Polymeric Structures

Examples of polymeric structures that can include an ionizable moiety or an ionic moiety and be used as ion-conducting polymers (ionomers) in the MEAs described here are provided below. The ion-conducting polymers may be used as appropriate in any of the MEA layers that include an ion-conducting polymer. Charge conduction through the material can be controlled by the type and amount of charge (e.g., anionic and/or cationic charge on the polymeric structure) provided by the ionizable/ionic moieties. In addition, the composition can include a polymer, a homopolymer, a copolymer, a block copolymer, a polymeric blend, other polymer-based forms, or other useful combinations of repeating monomeric units. As described below, an ion conducting polymer layer may include one or more of crosslinks, linking moieties, and arylene groups according to various embodiments. In some embodiments, two or more ion conducting polymers (e.g., in two or more ion conducting polymer layers of the MEA) may be crosslinked.

Non-limiting monomeric units can include one or more of the following:

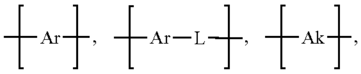

or

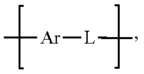

in which Ar is an optionally substituted arylene or aromatic; Ak is an optionally substituted alkylene, haloalkylene, aliphatic, heteroalkylene, or heteroaliphatic; and L is a linking moiety (e.g., any described herein) or can be —C($R^7$)($R^8$)—. Yet other non-limiting monomeric units can include optionally substituted arylene, aryleneoxy, alkylene, or combinations thereof, such as optionally substituted (aryl)(alkyl)ene (e.g., -Ak-Ar— or -Ak-Ar-Ak- or —Ar-Ak-, in which Ar is an optionally substituted arylene and Ak is an optionally substituted alkylene). One or more monomeric units can be optionally substituted with one or more ionizable or ionic moieties (e.g., as described herein).

One or more monomeric units can be combined to form a polymeric unit. Non-limiting polymeric units include any of the following:

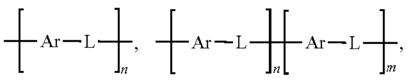

-continued

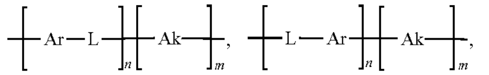

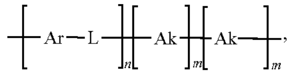

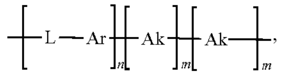

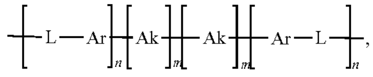

, or

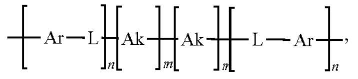

in which Ar, Ak, L, n, and m can be any described herein. In some embodiments, each m is independently 0 or an integer of 1 or more. In other embodiments, Ar can include two or more arylene or aromatic groups.

Other alternative configurations are also encompassed by the compositions herein, such as branched configurations, diblock copolymers, triblock copolymers, random or statistical copolymers, stereoblock copolymers, gradient copolymers, graft copolymers, and combinations of any blocks or regions described herein.

Examples of polymeric structures include those according to any one of formulas (I)-(V) and (X)-(XXXIV), or a salt thereof. In some embodiments, the polymeric structures are copolymers and include a first polymeric structure selected from any one of formulas (I)-(V) or a salt thereof; and a second polymeric structure including an optionally substituted aromatic, an optionally substituted arylene, a structure selected from any one of formulas (I)-(V) and (X)-(XXXIV), or a salt thereof.

In one embodiment, the MW of the ion-conducting polymer is a weight-average molecular weight (Mw) of at least 10,000 g/mol; or from about 5,000 to 2,500,000 g/mol. In another embodiment, the MW is a number average molecular weight (Mn) of at least 20,000 g/mol; or from about 2,000 to 2,500,000 g/mol.

In any embodiment herein, each of n, n1, n2, n3, n4, m, m1, m2, or m3 is, independently, 1 or more, 20 or more, 50 or more, 100 or more; as well as from 1 to 1,000,000, such as from 10 to 1,000,000, from 100 to 1,000,000, from 200 to 1,000,000, from 500 to 1,000,000, or from 1,000 to 1,000,000.

Non-limiting polymeric structures can include the following:

(I)

, (II)

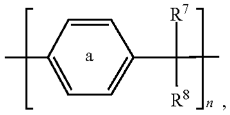

(III)

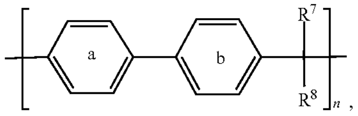

-continued (IV)

, (V)

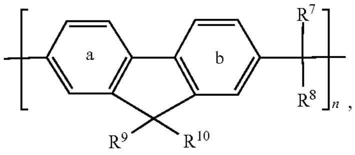

or a salt thereof, wherein:

each of $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;

Ar comprises or is an optionally substituted aromatic or arylene (e.g., any described herein);

each of n is, independently, an integer of 1 or more;

each of rings a-c can be optionally substituted; and rings a-c, $R^7$, $R^8$, $R^9$, and $R^{10}$ can optionally comprise an ionizable or ionic moiety.

Further non-limiting polymeric structures can include one or more of the following:

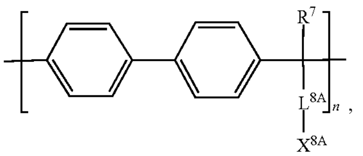

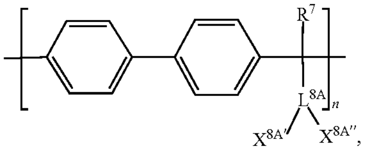

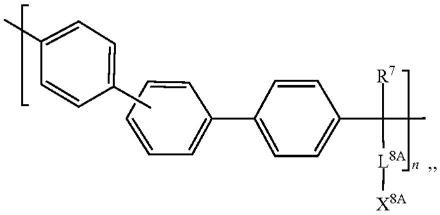

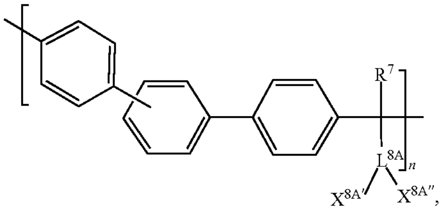

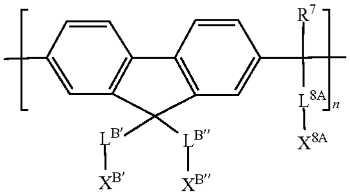

-continued
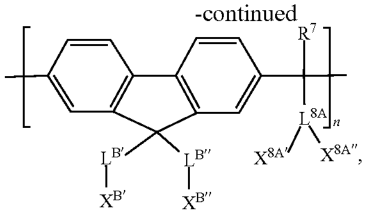
or a salt thereof, wherein:
$R^7$ can be any described herein (e.g., for formulas (I)-(V));
n is from 1 or more;
each $L^{8A}$, $L^{B'}$, and $L^{B''}$ is, independently, a linking moiety; and
each $X^{8A}$, $X^{8A'}$, $X^{8A''}$, $X^{B'}$, and $X^{B''}$ is, independently, an ionizable or ionic moiety.
Yet other polymeric structures include the following:
(X)
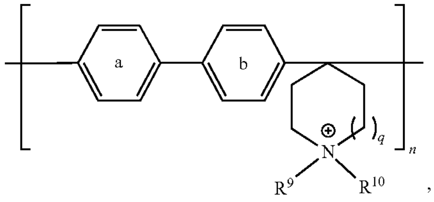
,
(XI)
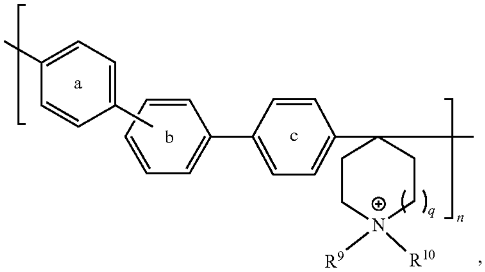
,
(XII)
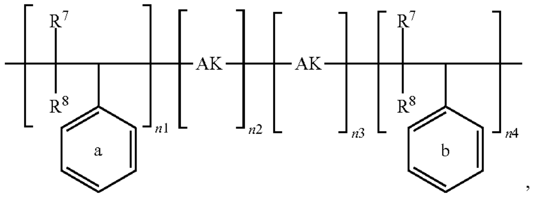
,
(XIII)
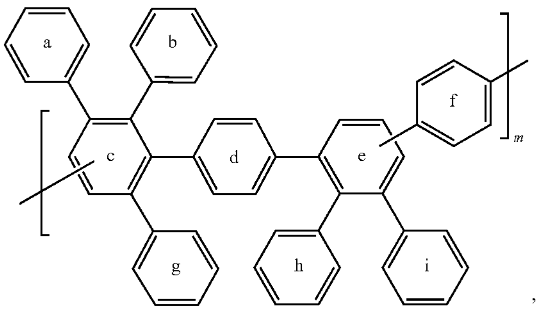
,
(XIV)
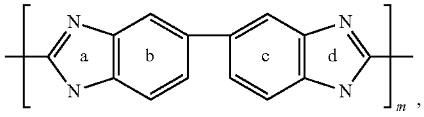
,
(XV)
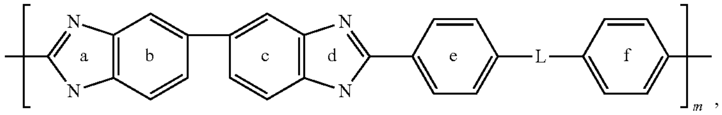
,
(XVI)
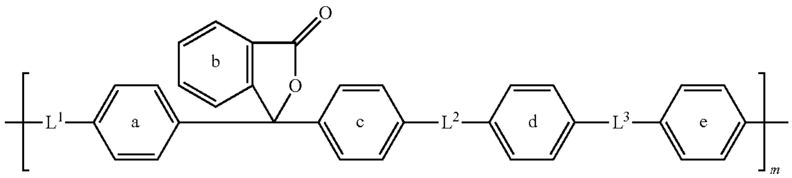
,
(XVII)
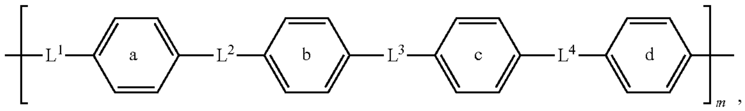
,
(XVIII)
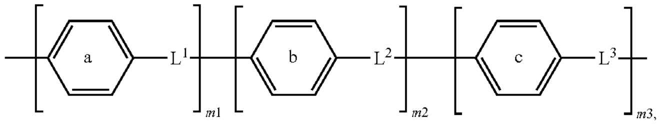

-continued
(XIX)
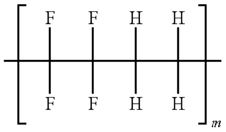
(XX)
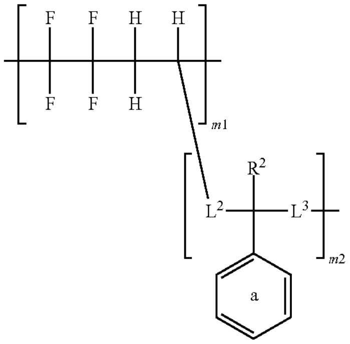
(XXI)
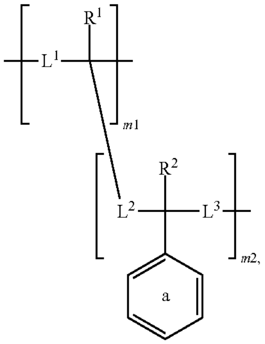
(XXII)
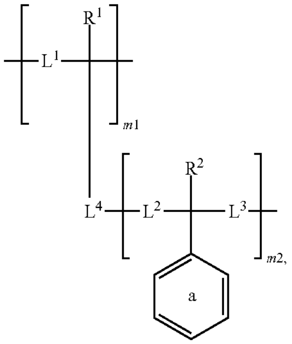
(XXIII)
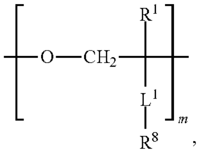
(XXIV)
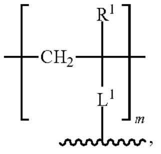
(XXV)
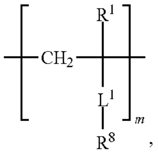
(XXVI)
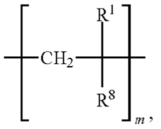
(XXVIII)
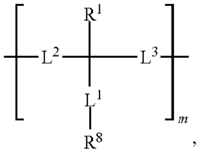
(XXVII)
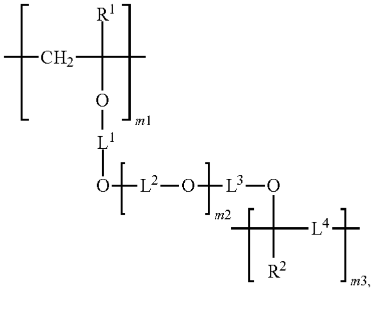
(XXIX)
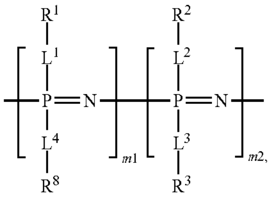
(XXX)
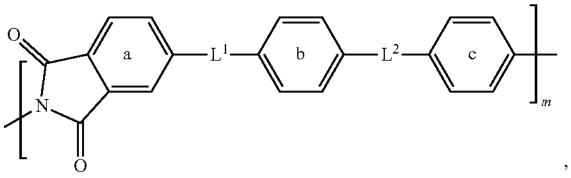

-continued (XXXI)

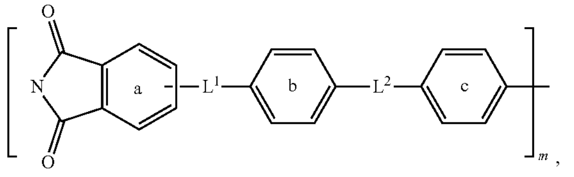

(XXXII)

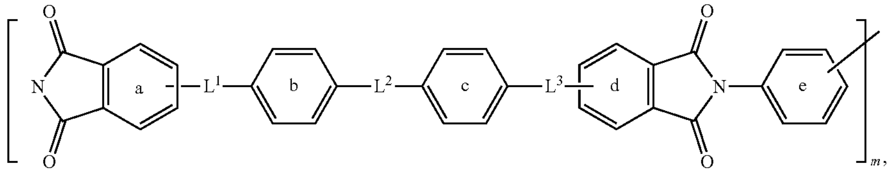

(XXXIII)

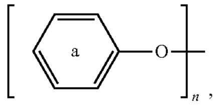

(XXXIV)

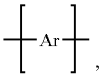

or a salt thereof, wherein:

each of $R^1$, $R^2$, $R^3$, $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;

each Ak is or comprises an optionally substituted aliphatic, alkylene, haloalkylene, heteroaliphatic, or heteroalkylene;

each Ar is or comprises an optionally substituted arylene or aromatic;

each of L, $L^1$, $L^2$, $L^3$, and $L^4$ is, independently, a linking moiety;

each of n, n1, n2, n3, n4, m, m1, m2, and m3 is, independently, an integer of 1 or more;

q is 0, 1, 2, or more;

each of rings a-i can be optionally substituted; and rings a-i, $R^7$, $R^8$, $R^9$, and $R^{10}$ can optionally include an ionizable or ionic moiety.

In particular embodiments (e.g., of formula (XIV) or (XV)), each of the nitrogen atoms on rings a and/or b are substituted with optionally substituted aliphatic, alkyl, aromatic, aryl, an ionizable moiety, or an ionic moiety. In some embodiments, one or more hydrogen or fluorine atoms (e.g., in formula (XIX) or (XX)) can be substituted to include an ionizable moiety or an ionic moiety (e.g., any described herein). In other embodiments, the oxygen atoms present in the polymeric structure (e.g., in formula XXVIII) can be associated with an alkali dopant (e.g., $K^+$).

In particular examples, Ar, one or more of rings a-i (e.g., rings a, b, f g, h, or i), L, $L^1$, $L^2$, $L^3$, $L^4$, Ak, $R^7$, $R^8$, $R^9$, and/or $R^{10}$ can be optionally substituted with one or more ionizable or ionic moieties and/or one or more electron-withdrawing groups. Yet other non-limiting substituents for Ar, rings (e.g., rings a-i), L, Ak, $R^7$, $R^8$, $R^9$, and $R^{10}$ include one or more described herein, such as cyano, hydroxy, nitro, and halo, as well as optionally substituted aliphatic, alkyl, alkoxy, alkoxyalkyl, amino, aminoalkyl, aryl, arylalkylene, aryloyl, aryloxy, arylalkoxy, hydroxyalkyl, and haloalkyl.

In some embodiments, each of $R^1$, $R^2$, and $R^3$ is, independently, H, optionally substituted aromatic, aryl, aryloxy, or arylalkylene. In other embodiments (e.g., of formulas (I)-(V) or (XII)), $R^7$ includes the electron-withdrawing moiety. In yet other embodiments, $R^8$, $R^9$, and/or $R^{10}$ includes an ionizable or ionic moiety.

In one instance, a polymeric subunit can lack ionic moieties. Alternatively, the polymeric subunit can include an ionic moiety on the Ar group, the L group, both the Ar and L groups, or be integrated as part of the L group. Non-limiting examples of ionizable and ionic moieties include cationic, anionic, and multi-ionic group, as described herein.

In any embodiment herein, the electron-withdrawing moiety can include or be an optionally substituted haloalkyl, cyano (CN), phosphate (e.g., $-O(P{=}O)(OR^{P1})(OR^{P2})$ or $-O-[P({=}O)(OR^{P1})-O]_{P3}-R^{P2}$), sulfate (e.g., $-O-S({=}O)_2(OR^{S1})$), sulfonic acid ($-SO_3H$), sulfonyl (e.g., $-SO_2-CF_3$), difluoroboranyl ($-BF_2$), borono ($B(OH)_2$), thiocyanato ($-SCN$), or piperidinium. Yet other non-limiting phosphate groups can include derivatives of phosphoric acid, such as orthophosphoric acid, pyrophosphoric acid, tripolyphosphoric acid, tetrapolyphosphoric acid, trimetaphosphoric acid, and/or phosphoric anhydride, or combinations thereof.

Yet other polymeric units can include poly(benzimidazole) (PBI), polyphenylene (PP), polyimide (PI), poly(ethyleneimine) (PEI), sulfonated polyimide (SPI), polysulfone (PSF), sulfonated polysulfone (SPSF), poly(ether ketone) (PEEK), PEEK with cardo groups (PEEK-WC), polyethersulfone (PES), sulfonated polyethersulfone (SPES), sulfonated poly(ether ketone) (SPEEK), SPEEK with cardo groups (SPEEK-WC), poly(p-phenylene oxide) (PPO), sulfonated polyphenylene oxide (SPPO), ethylene tetrafluoroethylene (ETFE), polytetrafluoroethylene (PTFE), poly (epichlorohydrin) (PECH), poly(styrene) (PS), sulfonated poly(styrene) (SPS), hydrogenated poly(butadiene-styrene) (HPBS), styrene divinyl benzene copolymer (SDVB), styrene-ethylene-butylene-styrene (SEBS), sulfonated bisphenol-A-polysulfone (SPSU), poly(4-phenoxy benzoyl-1,4-phenylene) (PPBP), sulfonated poly(4-phenoxy benzoyl-1,4-phenylene) (SPPBP), poly(vinyl alcohol) (PVA), poly (phosphazene), poly(aryloxyphosphazene), polyetherimide, as well as combinations thereof.

Bipolar MEA for COx Reduction

In certain embodiments, the MEA includes a bipolar interface having an anion-conducting polymer on the cathode side of the MEA and an interfacing cation-conducting polymer on the anode side of the MEA. In some implementations, the cathode contains a first catalyst and an anion-conducting polymer. In certain embodiments, the anode contains a second catalyst and a cation-conducting polymer. In some implementations, a cathode buffer layer, located between the cathode and PEM, contains an anion-conducting polymer. In some embodiments, an anode buffer layer, located between the anode and PEM, contains a cation-conducting polymer.

In embodiments employing an anion-conducting polymer in the cathode and/or in a cathode buffer layer, the MEA can decrease or block unwanted reactions that produce undesired products and decrease the overall efficiency of the cell. In embodiments employing a cation-conducting polymer in the anode and/or in an anode buffer layer can decrease or block unwanted reactions that reduce desired product production and reduce the overall efficiency of the cell.

For example, at levels of electrical potential used for cathodic reduction of $CO_2$, hydrogen ions may be reduced to hydrogen gas. This is a parasitic reaction; current that could be used to reduce $CO_2$ is used instead to reduce hydrogen ions. Hydrogen ions may be produced by various oxidation reactions performed at the anode in a $CO_2$ reduction reactor and may move across the MEA and reach the cathode where they can be reduced to produce hydrogen gas. The extent to which this parasitic reaction can proceed is a function of the concentration of hydrogen ions present at the cathode. Therefore, an MEA may employ an anion-conducting material in the cathode layer and/or in a cathode buffer layer. The anion-conducting material at least partially blocks hydrogen ions from reaching catalytic sites on the cathode. As a result, parasitic production of hydrogen gas decreases and the rate of production of CO or other carbon-containing product increases.

Another reaction that may be avoided is reaction of carbonate or bicarbonate ions at the anode to produce $CO_2$. Aqueous carbonate or bicarbonate ions may be produced from $CO_2$ at the cathode. If such ions reach the anode, they may react with hydrogen ions to produce and release gaseous $CO_2$. The result is net movement of $CO_2$ from the cathode to the anode, where it does not get reduced and is lost with oxidation products. To prevent the carbonate and bicarbonate ion produced at the cathode from reaching the anode, the anode and/or an anode buffer layer may include a cation-conducting polymer, which at least partially blocks the transport of negative ions such as bicarbonate ions to the anode.

Thus, in some designs, a bipolar membrane structure raises the pH at the cathode to facilitate $CO_2$ reduction while a cation-conducting polymer such as a proton-exchange layer prevents the passage of significant amounts of $CO_2$ and $CO_2$ reduction products (e.g., bicarbonate) to the anode side of the cell.

Figure 11:
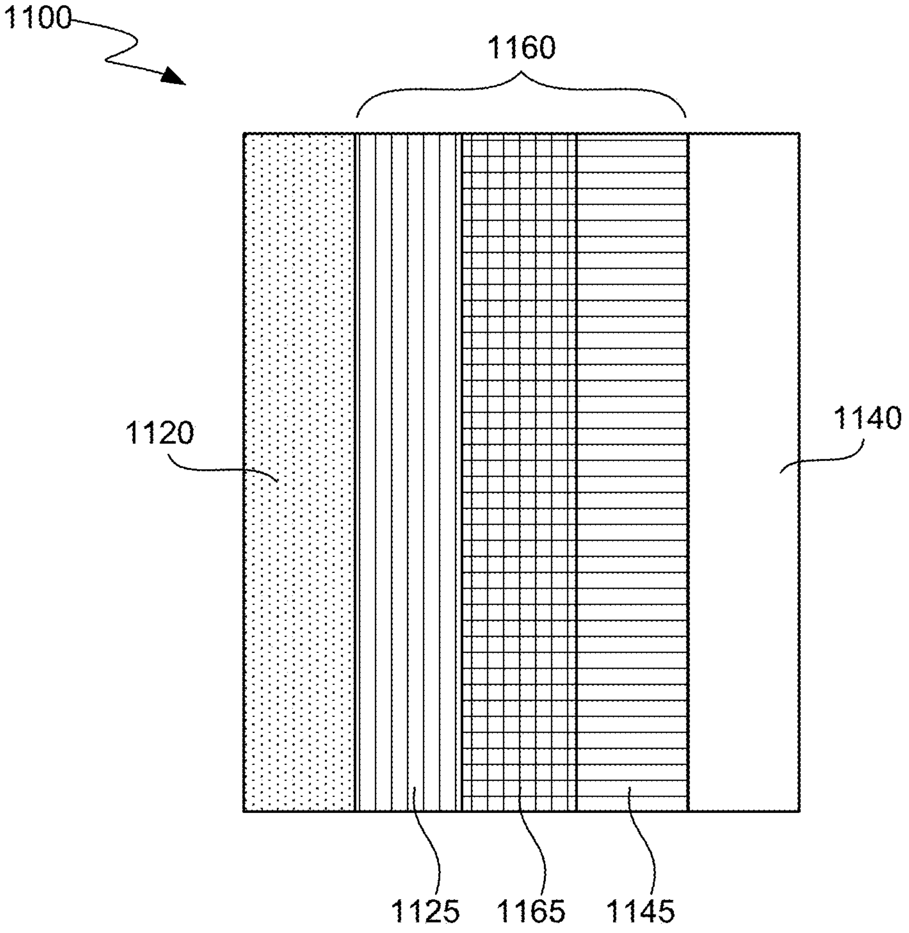
FIG. 11 depicts an example MEA for use in $CO_x$ reduction. The MEA has a cathode layer and an anode layer separated by an ion-conducting polymer layer.

An example MEA 1100 for use in $CO_x$ reduction is shown in FIG. 11. The MEA 1100 has a cathode layer 1120 and an anode layer 1140 separated by an ion-conducting polymer layer 1160 that provides a path for ions to travel between the cathode layer 1120 and the anode layer 1140. In certain embodiments, the cathode layer 1120 includes an anion-conducting polymer and/or the anode layer 1140 includes a cation-conducting polymer. In certain embodiments, the cathode layer and/or the anode layer of the MEA are porous. The pores may facilitate gas and/or fluid transport and may increase the amount of catalyst surface area that is available for reaction.

The ion-conducting layer 1160 may include two or three sublayers: a polymer electrolyte membrane (PEM) 1165, an optional cathode buffer layer 1125, and/or an optional anode buffer layer 1145. One or more layers in the ion-conducting layer may be porous. In certain embodiments, at least one layer is nonporous so that reactants and products of the cathode cannot pass via gas and/or liquid transport to the anode and vice versa. In certain embodiments, the PEM layer 1165 is nonporous. Example characteristics of anode buffer layers and cathode buffer layers are provided elsewhere herein. In certain embodiments, the ion-conducting layer includes only a single layer or two sublayers.

In some embodiments, a carbon oxide electrolyzer anode contains a blend of oxidation catalyst and an ion-conducting polymer. There are a variety of oxidation reactions that can occur at the anode depending on the reactant that is fed to the anode and the anode catalyst(s). In one arrangement, the oxidation catalyst is selected from the group consisting of metals and oxides of Ir, Pt, Ni, Ru, Pd, Au, and alloys thereof, IrRu, PtIr, Ni, NiFe, stainless steel, and combinations thereof. The oxidation catalyst can further contain conductive support particles such as carbon, boron-doped diamond, titanium, and any combination thereof.

As examples, the oxidation catalyst can be in the form of a structured mesh or can be in the form of particles. If the oxidation catalyst is in the form of particles, the particles can be supported by electronically conductive support particles. The conductive support particles can be nanoparticles. The conductive support particles may be compatible with the chemicals that are present in an electrolyzer anode when the electrolyzer is operating and are oxidatively stable so that they do not participate in any electrochemical reactions. It is especially useful if the conductive support particles are chosen with the voltage and the reactants at the anode in mind. In some arrangements, the conductive support particles are titanium, which is well-suited for high voltages. In other arrangements, the conductive support particles are carbon, which can be most useful at low voltages. In some embodiments, such conductive support particles are larger than the oxidation catalyst particles, and each conductive support particle can support one or more oxidation catalyst particles. In one arrangement, the oxidation catalyst is iridium ruthenium oxide. Examples of other materials that can be used for the oxidation catalyst include, but are not limited to, those listed above. It should be understood that many of these metal catalysts can be in the form of oxides, especially under reaction conditions.

As mentioned, in some embodiments, an anode layer of an MEA includes an ion-conducting polymer. In some cases, this polymer contains one or more covalently bound, negatively charged functional groups configured to transport mobile positively charged ions. Examples of the second ion-conducting polymer include ethanesulfonyl fluoride, 2-[1-[difluoro-[(trifluoroethenyl)oxy]methyl]-1,2,2,2-tetrafluoroethoxy]-1,1,2,2-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof. Commercially available examples of cation-conducting polymers include e.g., Nafion 115, Nafion 117, and/or Nafion 211. Other examples of cationic conductive ionomers described above are suitable for use in anode layers.

There may be tradeoffs in choosing the amount of ion-conducting polymer in the anode. For example, an anode may include enough anode ion-conducting polymer to provide sufficient ionic conductivity, while being porous so that reactants and products can move through it easily. An anode may also be fabricated to maximize the amount of catalyst surface area that is available for reaction. In various arrangements, the ion-conducting polymer in the anode makes up about 10 and 90 wt %, or about 20 and 80 wt %, or about 25 and 70 wt % of the total anode mass. As an example, the ion-conducting polymer may make up about 5 and 20 wt % of the anode. In certain embodiments, the anode may be configured to tolerate relatively high voltages, such as voltages above about 1.2 V vs. a reversible hydrogen electrode. In some embodiments, an anode is porous in order to maximize the amount of catalyst surface area available for reaction and to facilitate gas and liquid transport.

In one example of a metal catalyst, Ir or IrOx particles (100-200 nm) and Nafion ionomer form a porous layer approximately 10 μm thick. Metal catalyst loading is approximately 0.5-3 g/cm$^2$. In some embodiments, NiFeOx is used for basic reactions.

In some embodiments, the MEA and/or the associated cathode layer is designed or configured to accommodate gas generated in situ. Such gas may be generated via various mechanisms. For example, carbon dioxide may be generated when carbonate or bicarbonate ions moving from the cathode toward the anode encounter hydrogen ions moving from the anode toward the cathode. This encounter may occur, for example, at the interface of anionic and cationic conductive ionomers in a bipolar MEA. Alternatively, or in addition, such contact may occur at the interface of a cathode layer and a polymer electrolyte membrane. For example, the polymer electrolyte membrane may contain a cationic conductive ionomer that allows transport of protons generated at the anode. The cathode layer may include an anion conductive ionomer.

Left unchecked, the generation of carbon dioxide or other gas may cause the MEA to delaminate or otherwise be damaged. It may also prevent a fraction of the reactant gas from being reduced at the anode.

The location within or adjacent to an MEA where a gas such as carbon dioxide is generated in situ may contain one or more structures designed to accommodate such gas and, optionally, prevent the gas from reaching the anode, where it would be otherwise unavailable to react.

In certain embodiments, pockets or voids are provided at a location where the gas is generated. These pockets or voids may have associated pathways that allow the generated gas to exit from the MEA, optionally to the cathode where, for example, carbon dioxide can be electrochemically reduced. In certain embodiments, an MEA includes discontinuities at an interface of anionic and cationic conductive ionomer layers such as at such interface in a bipolar MEA. In some embodiments, a cathode structure is constructed in a way that includes pores or voids that allow carbon dioxide generated at or proximate to the cathode to evacuate into the cathode.

In some embodiments, such discontinuities or void regions are prepared by fabricating in MEA in a way that separately fabricates anode and cathode structures, and then sandwiches to the two separately fabricated structures together in a way that produces the discontinuities or voids.

In some embodiments, an MEA structure is fabricated by depositing copper or other catalytic material onto a porous or fibrous matrix such as a fluorocarbon polymer and then coating the resulting structure with an anionic conductive ionomer. In some embodiments, the coated structure is then attached to the remaining MEA structure, which may include an anode and a polymer electrolyte membrane such as a cationic conductive membrane.

In some embodiments, a cathode has a porous structure and/or an associated cathode buffer layer that has a porous structure. The pores may be present in an open cell format that allows generated carbon dioxide or other gas to find its way to the cathode.

In some MEAs, an interface between an anion conducting layer and a cation conducting layer (e.g., the interface of a cathode buffer layer and a PEM) includes a feature that resists delamination caused by carbon dioxide, water, or other material that may form at the interface. In some embodiments, the feature provides void space for the generated material to occupy until as it escapes from an MEA. In some examples, natural porosity of a layer such as an anion conducting layer provides the necessary void space. An interconnected network of pores may provide an escape route for carbon dioxide or other gas generated at the interface. In some embodiments, an MEA contains interlocking structures (physical or chemical) at the interface. In some embodiments, an MEA contains discontinuities at the interface. In some embodiments, an MEA contains a fibrous structure in one layer adjacent the interface. A further discussion of interfacial structures between anion and cation conducting layers of MEAs is contained in Published PCT Application No. 2021/108446, published Jun. 3, 2021, and titled "MEMBRANE ELECTRODE ASSEMBLY FOR COX REDUCTION," which is incorporated herein by reference in its entirety.

Cathode Catalyst Layer

Cathode Layer Functions

A primary function of the cathode catalyst layer is to provide a catalyst for $CO_x$ reduction. An example reaction is:

$$CO_2 + 2H^+ + 2e^- \rightarrow CO + H_2O.$$

The cathode catalyst layer may also have other functions that facilitate $CO_x$ conversion. These include water management, gas transport, reactant delivery to the metal catalyst, product removal, stabilizing the particulate structure of the metal catalyst, electronic and ionic conduction to the metal catalyst, and mechanical stability within the MEA.

Certain functions and challenges are particular to carbon oxide electrolyzers and are not found in MEA assemblies for other applications such as fuel cells or water electrolyzers. These challenges include that the cathode catalyst layer of the MEA transports gas (e.g., $CO_2$ or CO) in and gas (e.g., ethylene, methane, CO) or liquid (e.g., ethanol) out. The cathode catalyst layer may be designed or configured to prevent accumulation of water that can block gas transport. Further, catalysts for $CO_X$ reduction are sometimes less stable than catalysts like platinum that can be used in hydrogen fuel cells. These functions, their particular challenges, and how they can be addressed are described below.

Water Management (Cathode Catalyst Layer)

The cathode catalyst layer facilitates movement of water to prevent it from being trapped in the cathode catalyst layer. Trapped water can hinder access of $CO_x$ to the catalyst and/or hinder movement of reaction product out of the cathode catalyst layer.

Water management challenges are in many respects unique to $CO_x$ electrolyzers. For example, compared to a PEM fuel cell's oxygen electrode, a $CO_x$ electrolyzer uses a much lower gas flow rate. A $CO_x$ electrolyzer also may use a lower flow rate to achieve a high utilization of the input $CO_x$. Vapor phase water removal is determined by the volumetric gas flow, thus much less vapor phase water removal is carried out in a $CO_x$ electrolyzer. A $CO_x$ electrolyzer may also operate at higher pressure (e.g., 100 psi-450 psi) than a fuel cell; at higher pressure the same molar flow results in lower volumetric flow and lower vapor phase water removal. For some MEAs, the ability to remove vapor phase water is further limited by temperature limits not present in fuel cells. For example, $CO_2$ to CO reduction may be performed at about 50° C. and ethylene and methane production may be performed at 20° C.-25° C. This is compared to typical operating temperatures of 80° C. to 120° C. for fuel cells. As a result, there is even more liquid phase water to remove.

Properties that affect ability of the cathode catalyst layer to remove water include porosity; pore size; distribution of pore sizes; hydrophobicity; the relative amounts of ion conducting polymer, metal catalyst particles, and electronically-conductive support; the thickness of the layer; the distribution of the catalyst throughout the layer; and the distribution of the ion conducting polymer through the layer and around the catalyst.

A porous layer allows an egress path for water. In some embodiments, the cathode catalyst layer has a pore size distribution that includes some pores having sizes of about 1 nm-100 nm and other pores having sizes of at least about 1 micron. This size distribution can aid in water removal. The porous structures could be formed by one or more of: pores within the carbon supporting structures (e.g., support particles); stacking pores between stacked carbon nanoparticles; secondary stacking pores between agglomerated carbon spheres (micrometer scale); or inert filler (e.g., PTFE) introduced pores with the interface between the PTFE and carbon also creating irregular pores ranging from hundreds of nm to micrometers.

The thickness of cathode catalyst layer may contribute to water management. Using a thicker layer allows the catalyst and thus the reaction to be distributed in a larger volume. This spreads out the water distribution and makes it easier to manage. In certain embodiments, the cathode layer thickness is about 80 nm-300 μm.

Ion-conducting polymers having non-polar, hydrophobic backbones may be used in the cathode catalyst layer. In some embodiments, the cathode catalyst layer may include a hydrophobic polymer such as PTFE in addition to the ion-conducting polymer. In some embodiments, the ion-conducting polymer may be a component of a co-polymer that also includes a hydrophobic polymer. In some embodiments, the ion-conducting polymer has hydrophobic and hydrophilic regions. The hydrophilic regions can support water movement and the hydrophobic regions can support gas movement.

Gas Transport (Cathode Catalyst Layer)

The cathode catalyst layer is structured for gas transport. Specifically, $CO_x$ is transported to the catalyst and gas phase reaction products (e.g., CO, ethylene, methane, etc.) is transported out of the catalyst layer.

Certain challenges associated with gas transport are unique to $CO_x$ electrolyzers. Gas is transported both in and out of the cathode catalyst layer—$O_x$ in and products such as CO, ethylene, and methane out. In a PEM fuel cell, gas ($O_2$ or $H_2$) is transported in but nothing or product water comes out. And in a PEM water electrolyzer, water is the reactant with $O_2$ and $H_2$ gas products.

Operating conditions including pressures, temperature, and flow rate through the reactor affect the gas transport. Properties of the cathode catalyst layer that affect gas transport include porosity; pore size and distribution; layer thickness; and ionomer distribution. Example values of these parameters are provided elsewhere herein.

In some embodiments, the ionomer-catalyst contact is minimized. For example, the ionomer may form a continuous network along the surface of the carbon with minimal contact with the catalyst. The ionomer, support, and catalyst may be designed such that the ionomer has a higher affinity for the support surface than the catalyst surface. This can facilitate gas transport to and from the catalyst without being blocked by the ionomer, while allowing the ionomer to conduct ions to and from the catalyst.

Ionomer (Cathode Catalyst Layer)

The ionomer may have multiple functions including holding particles of the catalyst layer together and allowing movement of ions through the cathode catalyst layer. In some cases, the interaction of the ionomer and the catalyst surface may create an environment favorable for $CO_x$ reduction, increasing selectivity to a desired product and/or decreasing the voltage required for the reaction. Importantly, the ionomer is an ion-conducting polymer that allows the movement of ions through the cathode catalyst layer. Hydroxide, bicarbonate, and carbonate ions, for example, are moved away from the catalyst surface where the $CO_x$ reduction occurs.

In certain embodiments, an ion-conducting polymer of a cathode comprises at least one ion-conducting polymer that is an anion-conductor. This can be advantageous because it raises the pH compared to a proton conductor.

Various anion-conducting polymers are described above. Many of these have aryl groups in their backbones. Such ionomers may be used in cathode catalyst layers as described herein. In some embodiments, an ion-conducting polymer can comprise one or more covalently bound, positively charged functional groups configured to transport mobile negatively charged ions. Examples of such ion-conducting polymers include aminated tetramethyl polyphenylene; poly(ethylene-co-tetrafluoroethylene)-based quaternary ammonium polymer; quaternized polysulfone, blends thereof, and/or any other suitable ion-conducting polymers. The first ion-conducting polymer can be configured to solubilize salts of bicarbonate or hydroxide.

In some embodiments, an ion-conducting polymer in a cathode comprises at least one ion-conducting polymer that is a cation and an anion-conductor. Examples of such ion-conducting polymer include polyethers that can transport cations and anions and polyesters that can transport cations and anions. Further examples of such ion-conducting polymer include polyethylene oxide, polyethylene glycol, polyvinylidene fluoride, and polyurethane.

During use in an electrolyzer, a cation and anion conductor may raise the local pH (compared to a pure cation conductor.) Further, in some embodiments, it may be advantageous to use a cation and anion conductor to promote acid base recombination in a larger volume instead of at a 2D interface of anion-conducting polymer and cation conducting polymer. This can spread out water and $CO_2$ formation, heat generation, and potentially lower the resistance of the membrane by decreasing the barrier to the acid-base reaction. All of these may be advantageous in helping avoid the buildup of products, heat, and lowering resistive losses in the MEA leading to a lower cell voltage.

In certain embodiments, an anion-conducting polymer has a polymer backbone with covalently bound positively charged functional groups appended. These may include positively charged nitrogen groups in some embodiments. In some embodiments, the polymer backbone is non-polar, as described above. The polymer may have any appropriate molecular weight, e.g., 25,000 g/mol-150,000 g/mol, though it will be understood that polymers outside this range may be used.

Particular challenges for ion-conducting polymers in $CO_x$ electrolyzers include $CO_2$ dissolving in and/or solubilizing the polymers, making them less mechanically stable, prone to swelling, and allowing the polymer to move more freely. This makes the entire catalyst layer and polymer-electrolyte membrane less mechanically stable. In some embodiments, polymers that are not as susceptible to $CO_2$ plasticization are used. Also, unlike for water electrolyzers and fuel cells, conducting carbonate and bicarbonate ions is a key parameter for $CO_2$ reduction.

The introduction of polar functional groups, such as hydroxyl and carboxyl groups which can form hydrogen bonds, leads to pseudo-crosslinked network formation. Cross-linkers like ethylene glycol and aluminum acetylacetonate can be added to reinforce the anion exchange polymer layer and suppress polymer $CO_2$ plasticization. Additives like polydimethylsiloxane copolymer can also help mitigate $CO_2$ plasticization.

According to various embodiments, the ion-conducting polymer may have a bicarbonate ionic conductivity of at least 6 mS/cm, or in some embodiments at least 12 mS/cm, is chemically and mechanically stable at temperatures 80° C. and lower, and soluble in organic solvents used during fabrication such as methanol, ethanol, and isopropanol. The ion-conducting polymer is stable (chemically and has stable solubility) in the presence of the $CO_x$ reduction products. The ion-conducting polymer may also be characterized by its ion exchange capacity, the total of active sites or functional groups responsible for ion exchange, which may range from 2.1 mmol/g-2.6 mmol/g in some embodiments. In some embodiments, ion-conducting polymers having lower IECs such as greater than 1 or 1.5 mmol/g may be used.

Examples of anion-conducting polymers are given above in above table as Class A ion-conducting polymers.

The as-received polymer may be prepared by exchanging the anion (e.g., $I^-$, $Br^-$, etc.) with bicarbonate.

Also, as indicated above, in certain embodiments the ionomer may be a cation-and-anion-conducting polymer. Examples are given in the above table as Class B ion-conducting polymers.

There are tradeoffs in choosing the amount of cation-conducting polymer in the cathode. A cathode may include enough cathode ion-conducting polymer to provide sufficient ionic conductivity, but be sufficiently porous so that reactants and products can move through it easily and to maximize the amount of catalyst surface area that is available for reaction. In various arrangements, the cathode ion-conducting polymer makes up about 10 to 90 wt %, about 20 to 80 wt %, or about 30 to 70 wt % of the material in the cathode layer.

Metal Catalyst (Cathode Catalyst Layer)

In certain embodiments, metal catalysts have one or more of the properties presented above. In general, a metal catalyst catalyzes one or more $CO_x$ reduction reactions. The metal catalyst may be in the form of nanoparticles, but larger particles, films, and nanostructured surfaces may be used in some embodiments. The specific morphology of the nanoparticles may expose and stabilize active sites that have greater activity.

Examples of materials that can be used for the reduction catalyst particles include, but are not limited, to transition metals such as V, Cr, Mn, Fe, Co, Ni, Cu, Zr, Nb, Mo, Au, Ru, Rh, Pd, Ag, Cd, Hf, Ta, W, Re, Ir, Pt, and Hg, and combinations thereof, and/or any other suitable materials. Other catalyst materials can include alkali metals, alkaline earth metals, lanthanides, actinides, and post transition metals, such as Sn, Si, Ga, Pb, Al, Tl, Sb, Te, Bi, Sm, Tb, Ce, Nd and In or combinations thereof, and/or any other suitable catalyst materials. The choice of catalyst depends on the reaction performed at the cathode of the $CO_x$ electrolyzer.

The metal catalyst may be composed of pure metals (e.g., Cu, Au, Ag), but alloys or bimetallic systems may be used for certain reactions. In some embodiments, a metal catalyst comprises a dopant. Examples of dopants include boron, nitrogen, and hydrogen. In some cases, the metal catalyst comprises boron-doped copper. The concentration of dopant may be substantially uniform throughout the metal particle or it may vary as a function of distance from particle surface. For example, the dopant concentration may decrease with distance from the particle surface.

The choice of catalyst may be guided by the desired reaction. For example, for CO production, Au may be used; for methane and ethylene production, Cu may be used. $CO_2$ reduction has a high overpotential compared to other well-known electrochemical reactions such as hydrogen evolution and oxygen evolution on known catalysts. Small amounts of contaminants can poison catalysts for $CO_2$ conversion.

Different metal catalyst materials may be chosen at least in part based on the desired product and MEA operation. For example, the 1D nanowire may have a higher selectivity for ethylene production while triangular Cu nanoplates may have higher selectivity for methane. Nanocubes may show good selectivity for ethylene in an AEM MEA.

Support (Cathode Catalyst Layer)

As explained above, support structures may be particles. But more generally, they may have many different shapes such as spheres, polygons (e.g., triangles), nanotubes, and sheets (e.g., graphene). Structures having high surface area to volume are useful to provide sites for catalyst particles to attach. Support structures may also be characterized by their porosity, surface area per volume, electrical conductivity, functional groups (N-doped, O-doped, etc), and the like. Various characteristics of particulate support structures are presented above.

If present, a support of the cathode catalyst particles may have any of various functions. It may stabilize metal nanoparticles to prevent them from agglomerating and distribute the catalytic sites throughout the catalyst layer volume to spread out loss of reactants and formation of products. A support may also provide an electrically conductive pathway to metal nanoparticles. Carbon particles, for example, pack together such that contacting carbon particles provide the electrically conductive pathway. Void space between the particles forms a porous network that gas and liquids can travel through.

The support may be hydrophobic and have affinity to the metal nanoparticle.

In many cases, the conductive support particles are compatible with the chemicals that are present in the cathode during operation, are reductively stable, and have a high hydrogen production overpotential so that they do not participate in any electrochemical reactions. In certain embodiments, conductive support particles are larger than the reduction catalyst particles, and each conductive support particle can support many reduction catalyst particles.

Examples of carbon blacks that can be used include:

- Vulcan XC-72R-Density of 256 mg/cm2, 30-50 nm
- Ketjen Black-Hollow structure, Density of 100-120 mg/cm2, 30-50 nm
- Printex Carbon, 20-30 nm Properties of the Cathode Catalyst Layer In certain embodiments, a cathode layer has a porosity of about 15 to 75%. Porosity of the cathode layer may be determined by various techniques. In one method, the loading of each component (e.g., catalyst, support, and polymer) is multiplied by its respective density. These are added together to determine the thickness the components take up in the material. This is then divided by the total known thickness to obtain the percentage of the layer that is occupied by the material. The resulting percentage is then subtracted from 1 to obtain the percentage of the layer assumed to be void space (e.g., filled with air or other gas or a vacuum), which is the porosity. In some embodiments, porosity is determined directly by a method such as mercury porosimetry or image analysis of TEM images.

The cathode layer may also be characterized by its roughness. The surface characteristics of the cathode layer can impact the resistances across the membrane electrode assembly. Excessively rough cathode layers can potentially lead to interfacial gaps between the catalyst and a current collectors or other electronically conductive support layer such as a microporous layer. These gaps hinder electron transfer from the current collector to the catalytic area, thus, increasing contact resistances. Interfacial gaps may also serve as locations for water accumulation that is detrimental to mass transport of reactants and products. On the other hand, extremely smooth surfaces may suffer from poor adhesion between layers. Cathode layer roughness may influence electrical contact resistances and concentration polarization losses. Surface roughness can be measured using different techniques (e.g. mechanical stylus method, optical profilometry, or atomic force microscopy) and is defined as the high-frequency, short wavelength component of a real surface. Arithmetic mean height, $S_a$, is a parameter that is commonly used to evaluate the surface roughness. Numerically, it is calculated by integrating the absolute height of valleys and peaks on the surface relative to the mean plane over the entire geometric area of the sample. Cathode layer $S_a$ values between 0.50-1.10 μm or 0.70-0.90 μm may be used in some embodiments.

Examples of Cathode Catalyst Layer Characteristics for CO, Methane, and Ethylene/Ethanol Productions

- CO production: Au nanoparticles 4 nm in diameter supported on Vulcan XC72R carbon and mixed with TM1 anion exchange polymer electrolyte from Orion. Layer is about 15 μm thick, Au/(Au+C)=30%, TM1 to catalyst mass ratio of 0.32, mass loading of 1.4-1.6 mg/$cm^2$, estimated porosity of 0.47
- Methane production: Cu nanoparticles of 20-30 nm size supported on Vulcan XC72R carbon, mixed with FAA-3 anion exchange solid polymer electrolyte from Fumatech. FAA-3 to catalyst mass ratio of 0.18. Estimated Cu nanoparticle loading of ~7.1 μg/$cm^2$, within a wider range of 1-100 μg/$cm^2$
- Ethylene/ethanol production: Cu nanoparticles of 25-80 nm size, mixed with FAA-3 anion exchange solid polymer electrolyte from Fumatech. FAA-3 to catalyst mass ratio of 0.10. Deposited either on Sigracet 39BC GDE for pure AEM or onto the polymer-electrolyte membrane. Estimated Cu nanoparticle loading of 270 μg/$cm^2$.
- Bipolar MEA for methane production: The catalyst ink is made up of 20 nm Cu nanoparticles supported by Vulcan carbon (Premetek 40% Cu/Vulcan XC-72) mixed with FAA-3 anion exchange solid polymer electrolyte (Fumatech), FAA-3 to catalyst mass ratio of 0.18. The cathode is formed by the ultrasonic spray deposition of the catalyst ink onto a bipolar membrane including FAA-3 anion exchange solid polymer electrolyte spray-coated on Nafion (PFSA) 212 (Fuel Cell Etc) membrane. The anode is composed of IrRuOx which is spray-coated onto the opposite side of the bipolar membrane, at a loading of 3 mg/$cm^2$. A porous carbon gas diffusion layer (Sigracet 39BB) is sandwiched to the Cu catalyst-coated bipolar membrane to compose the MEA.
- Bipolar MEA for ethylene production: The catalyst ink is made up of pure 80 nm Cu nanoparticles (Sigma Aldrich) mixed with FAA-3 anion exchange solid polymer electrolyte (Fumatech), FAA-3 to catalyst mass ratio of 0.09. The cathode is formed by the ultrasonic spray deposition of the catalyst ink onto a bipolar membrane including FAA-3 anion exchange solid polymer electrolyte spray-coated on Nafion (PFSA) 115 (Fuel Cell Etc) membrane. The anode is composed of IrRuOx which is spray-coated onto the opposite side of the bipolar membrane, at a loading of 3 mg/$cm^2$. A porous carbon gas diffusion layer (Sigracet 39BB) is sandwiched to the Cu catalyst-coated bipolar membrane to compose the MEA.
- CO production: Au nanoparticles 4 nm in diameter supported on Vulcan XC72R carbon and mixed with TM1 anion exchange polymer electrolyte from Orion. Layer is about 14 micron thick, Au/(Au+C)=20%. TM1 to catalyst mass ratio of 0.32, mass loading of 1.4-1.6 mg/$cm^2$, estimated porosity of 0.54 in the catalyst layer.
- CO production: Au nanoparticles 45 nm in diameter supported on Vulcan XC72R carbon and mixed with TM1 anion exchange polymer electrolyte from Orion. Layer is about 11 micron thick, Au/(Au+C)=60%. TM1 to catalyst mass ratio of 0.16, mass loading of 1.1-1.5 mg/$cm^2$, estimated porosity of 0.41 in the catalyst layer.
- CO production: Au nanoparticles 4 nm in diameter supported on Vulcan XC72R carbon and mixed with TM1 anion exchange polymer electrolyte from Orion. Layer is about 25 micron thick, Au/(Au+C)=20%. TM1 to catalyst mass ratio of 0.32, mass loading of 1.4-1.6 mg/$cm^2$, estimated porosity of 0.54 in the catalyst layer.

PEM

MEAs may include a polymer electrolyte membrane (PEM) disposed between and conductively coupled to the anode catalyst layer and the cathode catalyst layer. In certain embodiments, a polymer electrolyte membrane has high ionic conductivity (e.g., greater than about 1 mS/cm) and is mechanically stable. Mechanical stability can be evidenced in a variety of ways such as through high tensile strength, modulus of elasticity, elongation to break, and tear resistance. Many commercially available membranes can be used for the polymer electrolyte membrane. Examples include, but are not limited to, various Nafion® formulations, GORE-SELECT, FumaPEM® (PFSA) (FuMA-Tech GmbH), and Aquivion (PFSA) (Solvay).

In one arrangement, the PEM comprises at least one ion-conducting polymer that is a cation-conductor. The third ion-conducting polymer can comprise one or more covalently-bound, negatively-charged functional groups configured to transport mobile positively-charged ions. The third ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof.

Cathode Buffer Layer

When the polymer electrolyte membrane is a cation conductor (e.g., it conducts protons), it may contain a high concentration of protons during operation of the CRR, while a cathode may operate better when a low concentration of protons is present. A cathode buffer layer may be provided between the polymer electrolyte membrane and the cathode to provide a region of transition from a high concentration of protons to a low concentration of protons. In one arrangement, a cathode buffer layer is an ion-conducting polymer with many of the same properties as the ion-conducting polymer in the cathode. A cathode buffer layer may provide a region for the proton concentration to transition from a polymer electrolyte membrane, which has a high concentration of protons, to the cathode, which has a low proton concentration. Within the cathode buffer layer, protons from the polymer electrolyte membrane may encounter anions from the cathode, and they may neutralize one another. The cathode buffer layer may help ensure that a deleterious number of protons from the polymer electrolyte membrane does not reach the cathode and raise the proton concentration. If the proton concentration of the cathode is too high, $CO_x$ reduction does not occur. A high proton concentration may be a concentration in the range of about 10 to 0.1 molar and low proton concentration may be a concentration of less than about 0.01 molar.

A cathode buffer layer can include a single polymer or multiple polymers. If the cathode buffer layer includes multiple polymers, the multiple polymers can be mixed together or can be arranged in separate, adjacent layers. Examples of materials that can be used for the cathode buffer layer include, but are not limited to, FumaSep FAA-3, Tokuyama anion exchange membrane material, and polyether-based polymers, such as polyethylene oxide (PEO), and blends thereof. Further examples are given above in the discussion of the cathode catalyst layer.

The thickness of the cathode buffer layer is chosen to be sufficient that $CO_x$ reduction activity is high due to the proton concentration being low. This sufficiency can be different for different cathode buffer layer materials. In general, the thickness of the cathode buffer layer is between approximately 200 nm and 100 μm, between 300 nm and 75 μm, between 500 nm and 50 μm, or any suitable range.

In some embodiments, the cathode buffer layer is less than 50 μm, for example between 1-25 μm such between 1-5 μm, 5-15 μm, or 10-25 μm. By using a cathode buffer layer in this range of thicknesses, the proton concentration in the cathode can be reduced while maintaining the overall conductivity of the cell. In some embodiments, an ultra-thin layer (100 nm-1 μm and in some embodiments, sub-micron) may be used. And as discussed above, in some embodiments, the MEA does not have a cathode buffer layer. In some such embodiments, anion-conducting polymer in the cathode catalyst layer is sufficient. The thickness of the cathode buffer layer may be characterized relative to that of the PEM.

Water and $CO_2$ formed at the interface of a cathode buffer layer and a PEM can delaminate the MEA where the polymer layers connect. The delamination problem can be addressed by employing a cathode buffer layer having inert filler particles and associated pores. One possible explanation of its effectiveness is that the pores create paths for the gaseous carbon dioxide to escape back to the cathode where it can be reduced.

Materials that are suitable as inert filler particles include, but are not limited to, $TiO_2$, silica, PTFE, zirconia, and alumina. In various arrangements, the size of the inert filler particles is between 5 nm and 500 μm, between 10 nm and 100 μm, or any suitable size range. The particles may be generally spherical.

If PTFE (or other filler) volume is too high, it will dilute the polymer electrolyte to the point where ionic conductivity is low. Too much polymer electrolyte volume will dilute the PTFE to the point where it does not help with porosity. In many embodiments a mass ratio of polymer electrolyte/PTFE is 0.25 to 2, and more particularly, 0.5 to 1. A volume ratio polymer electrolyte/PTFE (or, more generally, polymer electrolyte/inert filler) may be 0.25 to 3, 0.5 to 2, 0.75 to 1.5, or 1.0 to 1.5.

In other arrangements, porosity is achieved by using particular processing methods when the layers are formed. One example of such a processing method is laser ablation, where nano to micro-sized channels are formed in the layers. Another example is mechanically puncturing a layer to form channels through it.

In one arrangement, the cathode buffer layer has a porosity between 0.01% and 95% (e.g., approximately between, by weight, by volume, by mass, etc.). However, in other arrangements, the cathode buffer layer can have any suitable porosity (e.g., between 0.01-95%, 0.1-95%, 0.01-75%, 1-95%, 1-90%). In some embodiments, the porosity is 50% or less, e.g., 0.1-50%, 5-50%, 20-50%, 5-40%, 10-40%, 20-40%, or 25%-40%. In some embodiments, the porosity is 20% or below, e.g. 0.1-20%, 1-10%, or 5-10%.

Porosity may be measured as described above with respect to the catalyst layer, including using mass loadings and thicknesses of the components, by methods such as mercury porosimetry, x-ray diffraction (SAXS or WAXS), and image processing on TEM images to calculate filled space vs. empty space. Porosity is measured when the MEA is completely dry as the materials swell to varying degrees when exposed to water during operation.

Porosity in layers of the MEA, including the cathode buffer layer, is described further below.

Anode Buffer Layer

In some CRR reactions, bicarbonate is produced at the cathode. It can be useful if there is a polymer that blocks bicarbonate transport somewhere between the cathode and the anode, to prevent migration of bicarbonate away from the cathode. It can be that bicarbonate takes some $CO_2$ with it as it migrates, which decreases the amount of $CO_2$ available for reaction at the cathode. In some MEAs, the polymer electrolyte membrane includes a polymer that blocks bicarbonate transport. Examples of such polymers include, but are not limited to, Nafion® formulations, GORE-SELECT, FumaPEM® (PFSA) (FuMA-Tech GmbH), and Aquivion (PFSA) (Solvay). In some MEAs, there is an anode buffer layer between the polymer electrolyte membrane and the anode, which blocks transport of bicarbonate. If the polymer electrolyte membrane is an anion-conductor, or does not block bicarbonate transport, then an additional anode buffer layer to prevent bicarbonate transport can be useful. Materials that can be used to block bicarbonate transport include, but are not limited to Nafion® formulations, GORE-SELECT, FumaPEM® (PFSA) (FuMA-Tech GmbH), and Aquivion (PFSA) (Solvay). Of course, including a bicarbonate blocking feature in the ion-exchange layer is not particularly desirable if there is no bicarbonate in the CRR.

In certain embodiments, an anode buffer layer provides a region for proton concentration to transition between the polymer electrolyte membrane to the anode. The concentration of protons in the polymer electrolyte membrane depends both on its composition and the ion it is conducting. For example, a Nafion polymer electrolyte membrane conducting protons has a high proton concentration. A FumaSep FAA-3 polymer electrolyte membrane conducting hydroxide has a low proton concentration. For example, if the desired proton concentration at the anode is more than 3 orders of magnitude different from the polymer electrolyte membrane, then an anode buffer layer can be useful to affect the transition from the proton concentration of the polymer electrolyte membrane to the desired proton concentration of the anode. The anode buffer layer can include a single polymer or multiple polymers. If the anode buffer layer includes multiple polymers, the multiple polymers can be mixed together or can be arranged in separate, adjacent layers. Materials that can be useful in providing a region for the pH transition include, but are not limited to, Nafion, FumaSep FAA-3, Sustainion®, Tokuyama anion exchange polymer, and polyether-based polymers, such as polyethylene oxide (PEO), blends thereof, and/or any other suitable materials. High proton concentration is considered to be in the range of approximately 10 to 0.1 molar and low concentration is considered to be less than approximately 0.01 molar. Ion-conducting polymers can be placed in different classes based on the type(s) of ions they conduct. This has been discussed in more detail above. There are three classes of ion-conducting polymers described in Table 1 above. In one embodiment of the invention, at least one of the ion-conducting polymers in the cathode, anode, polymer electrolyte membrane, cathode buffer layer, and anode buffer layer is from a class that is different from at least one of the others.

Layer Porosity

It can be useful if some or all of the following layers are porous: the cathode, the cathode buffer layer, the anode and the anode buffer layer. In some arrangements, porosity is achieved by combining inert filler particles with the polymers in these layers. Materials that are suitable as inert filler particles include, but are not limited to, $TiO_2$, silica, PTFE, zirconia, and alumina. In various arrangements, the size of the inert filler particles is between 5 nm and 500 μm, between 10 nm and 100 μm, or any suitable size range. In other arrangements, porosity is achieved by using particular processing methods when the layers are formed. One example of such a processing method is laser ablation, where nano to micro-sized channels are formed in the layers. Laser ablation can additionally or alternatively achieve porosity in a layer by subsurface ablation. Subsurface ablation can form voids within a layer, upon focusing the beam at a point within the layer, and thereby vaporizing the layer material in the vicinity of the point. This process can be repeated to form voids throughout the layer, and thereby achieving porosity in the layer. The volume of a void is preferably determined by the laser power (e.g., higher laser power corresponds to a greater void volume) but can additionally or alternatively be determined by the focal size of the beam, or any other suitable laser parameter. Another example is mechanically puncturing a layer to form channels through the layer. The porosity can have any suitable distribution in the layer (e.g., uniform, an increasing porosity gradient through the layer, a random porosity gradient, a decreasing porosity gradient through the layer, a periodic porosity, etc.).

The porosities (e.g., of the cathode buffer layer, of the anode buffer layer, of the membrane layer, of the cathode layer, of the anode layer, of other suitable layers, etc.) of the examples described above and other examples and variations preferably have a uniform distribution, but can additionally or alternatively have any suitable distribution (e.g., a randomized distribution, an increasing gradient of pore size through or across the layer, a decreasing gradient of pore size through or across the layer, etc.). The porosity can be formed by any suitable mechanism, such as inert filler particles (e.g., diamond particles, boron-doped diamond particles, polyvinylidene difluoride/PVDF particles, polytetrafluoroethylene/PTFE particles, etc.) and any other suitable mechanism for forming substantially non-reactive regions within a polymer layer. The inert filler particles can have any suitable size, such as a minimum of about 10 nanometers and a maximum of about 200 nanometers, and/or any other suitable dimension or distribution of dimensions.

As discussed above, the cathode buffer layer preferably has a porosity between about 1 and 90 percent by volume but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%, etc.). in some embodiments, the porosity is 20% or below, e.g. 0.1-20%, 1-10%, or 5-10%.

In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode.

Other Embodiments and Conclusion

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A catalyst composition comprising:

electrically conductive support particles;

metal catalyst particles attached to the electrically conductive support particles, wherein the metal catalyst particles have a mean diameter of about 2 to 100 nm; and an ionomer in direct contact with the metal catalyst particles, wherein at least about 50% of the metal catalyst particles are in direct contact with the ionomer.

2. The catalyst composition of claim 1, wherein the metal catalyst particles have a particle size dispersity of at most about 200%.

3. The catalyst composition of claim 2, wherein the metal catalyst particles have a particle size dispersity of at most about 15%.

4. The catalyst composition of claim 1, wherein at least some of the metal catalyst particles attached to the conductive support particles have nearest neighbor metal catalyst particles on the respective conductive support particles to which they are attached, and wherein a spacing between the nearest neighbor metal catalyst particles has a dispersity of about 50% or less.

5. The catalyst composition of claim 1, wherein the metal catalyst particles have a loading in catalyst composition of about 10-80% by mass fraction.

6. The catalyst composition of claim 1, wherein at least about 80% of electrically conductive particles are attached to the metal catalyst particles.

7. The catalyst composition of claim 1, wherein at least about 95% of the metal catalyst particles are attached to the electrically conductive support particles.

8. The catalyst composition of claim 1, wherein at least about 50% of the metal catalyst particles are single crystal particles.

9. The catalyst composition of claim 1, wherein at least about 85% of metal catalyst particles in the composition have a sphericity of at least about 90%.

10. The catalyst composition of claim 1, wherein the electrically conductive support particles have a mean diameter of about 10 to 100 nm.

11. The catalyst composition of claim 1, wherein the electrically conductive support particles have a porosity of about 10% to 80%.

12. The catalyst composition of claim 1, wherein the electrically conductive support particles have a surface area to volume of about 20 to 2000 $cm^3$/100 g.

13. The catalyst composition of claim 1, wherein the metal catalyst particles comprise at least about 90% atomic of a metal selected from the group consisting of gold, platinum, rhenium, ruthenium, rhodium, palladium, silver, osmium, and iridium.

14. The catalyst composition of claim 1, wherein the metal catalyst particles comprise gold metal.

15. The catalyst composition of claim 1, wherein the metal catalyst particles comprise about 200 ppm or less of boron or one or more alkali metals.

16. The catalyst composition of claim 1, wherein the metal catalyst particles comprise about 20 ppm or less of any transition metal.

17. The catalyst composition of claim 1, wherein the electrically conductive support particles comprise carbon.

18. The catalyst composition of claim 1, wherein the electrically conductive support particles comprise an amorphous carbon.

19. The catalyst composition of claim 1, wherein the electrically conductive support particles comprise carbon black.

20. The catalyst composition of claim 1, wherein the metal catalyst particles are coated with the ionomer.

21. A membrane electrode assembly comprising the catalyst composition of claim 1.

* * * * *